US009817627B2

(12) United States Patent
Kreiner et al.

(10) Patent No.: US 9,817,627 B2
(45) Date of Patent: Nov. 14, 2017

(54) METHOD AND APPARATUS FOR PRESENTATION OF MEDIA CONTENT

(71) Applicant: AT&T Intellectual Property I, LP, Atlanta, GA (US)

(72) Inventors: Barrett M. Kreiner, Woodstock, GA (US); Jonathan L. Reeves, Roswell, GA (US); Ryan Schaub, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 16 days.

(21) Appl. No.: 14/450,599

(22) Filed: Aug. 4, 2014

(65) Prior Publication Data
US 2016/0034240 A1 Feb. 4, 2016

(51) Int. Cl.
G09G 5/00 (2006.01)
G06F 3/14 (2006.01)
G09F 9/302 (2006.01)
H04N 21/41 (2011.01)
H04N 21/43 (2011.01)
(Continued)

(52) U.S. Cl.
CPC .......... *G06F 3/1446* (2013.01); *G09F 9/3026* (2013.01); *H04N 21/4122* (2013.01); *H04N 21/431* (2013.01); *H04N 21/4305* (2013.01); *H04N 21/4622* (2013.01)

(58) Field of Classification Search
None
See application file for complete search history.

(56) References Cited

U.S. PATENT DOCUMENTS

| 4,528,597 A | 7/1985 | Klein et al. |
| 4,743,202 A | 5/1988 | Bach |
| 4,866,530 A | 9/1989 | Kalua |

(Continued)

FOREIGN PATENT DOCUMENTS

| GB | 1139315 A | 1/1969 |
| GB | 2147444 A | 5/1985 |

(Continued)

OTHER PUBLICATIONS

"The ultimate canvas for digital signage", http://www.christiedigital.com/en-us/digital-signage/products/microtiles/pages/microtilesdigital-signage-video-wall.aspx, christiedigital.com, 2014, 12 pages.

(Continued)

*Primary Examiner* — Brian P. Yenke
*Assistant Examiner* — Humam Satti
(74) *Attorney, Agent, or Firm* — Guntin & Gust, PLC; Joseph Hrutka

(57) ABSTRACT

Aspects of the subject disclosure may include, for example, a method including receiving, by a system comprising a processor, a multicast video stream directed to an array of a plurality of display modules movably attached to a modular display, extracting, by the system, video display data from the multicast video stream according to a location within the array of a first display module of the plurality of display modules, and updating, by the system, a video display of the first display module according to the video display data that is extracted from the multicast video stream, wherein the updating is synchronized to a master clock of the modular display. Other embodiments are disclosed.

20 Claims, 13 Drawing Sheets

(51) Int. Cl.
*H04N 21/431* (2011.01)
*H04N 21/462* (2011.01)

(56) References Cited

U.S. PATENT DOCUMENTS

| | | | |
|---|---|---|---|
| 4,969,046 A | 11/1990 | Sugimoto et al. | |
| 5,079,636 A * | 1/1992 | Brody | G02F 1/13336 345/205 |
| 5,523,769 A | 6/1996 | Lauer et al. | |
| 5,790,371 A | 8/1998 | Latocha et al. | |
| 5,995,179 A | 11/1999 | Tamura et al. | |
| 6,054,968 A | 4/2000 | De | |
| 6,150,996 A | 11/2000 | Nicholson et al. | |
| 6,169,632 B1 | 1/2001 | Kurtenbach et al. | |
| 6,285,343 B1 | 9/2001 | Brody | |
| 6,314,669 B1 | 11/2001 | Tucker | |
| 6,630,922 B2 * | 10/2003 | Fishkin | G06F 1/16 345/156 |
| 6,634,124 B1 | 10/2003 | Bierschbach | |
| 6,813,853 B1 | 11/2004 | Tucker | |
| 6,881,946 B2 | 4/2005 | Cok et al. | |
| 7,064,673 B1 | 6/2006 | Bonham | |
| 7,355,562 B2 | 4/2008 | Schubert et al. | |
| 7,373,747 B1 | 5/2008 | Wiemer et al. | |
| 7,719,480 B2 | 5/2010 | Devos et al. | |
| 8,296,981 B1 | 10/2012 | Gardinier et al. | |
| 8,410,993 B2 * | 4/2013 | Jenks | H04N 9/12 345/1.3 |
| 8,434,898 B2 | 5/2013 | Sanfilippo et al. | |
| 8,482,482 B2 * | 7/2013 | Chu | G06F 3/1446 345/1.3 |
| 2002/0071247 A1 * | 6/2002 | Clark | G06F 3/1446 361/679.21 |
| 2004/0222941 A1 * | 11/2004 | Wong | G06F 3/1431 345/1.1 |
| 2004/0233125 A1 * | 11/2004 | Tanghe | G06F 3/1446 345/1.3 |
| 2008/0141572 A1 | 6/2008 | Tomich et al. | |
| 2008/0259031 A1 * | 10/2008 | Yoshino | G06F 3/011 345/158 |
| 2010/0123732 A1 * | 5/2010 | Jenks | H04N 9/12 345/592 |
| 2010/0156854 A1 * | 6/2010 | Fisher | G06F 3/1446 345/204 |
| 2010/0313150 A1 * | 12/2010 | Morris | G06F 9/4445 715/761 |
| 2012/0236509 A1 * | 9/2012 | Cope | G02F 1/133305 361/730 |
| 2014/0035795 A1 * | 2/2014 | Park | G06F 3/1431 345/1.3 |
| 2014/0173507 A1 * | 6/2014 | Demeyere | G06T 11/60 715/789 |
| 2014/0313408 A1 * | 10/2014 | Sharma | H04L 67/10 348/383 |
| 2015/0084837 A1 * | 3/2015 | Mese | G06F 3/1446 345/1.3 |
| 2015/0277496 A1 * | 10/2015 | Reeves | G06F 1/1641 345/1.2 |
| 2015/0278981 A1 * | 10/2015 | Akenine-Moller | G06T 1/20 345/522 |

FOREIGN PATENT DOCUMENTS

| | | |
|---|---|---|
| JP | 2007125406 A | 5/2007 |
| WO | 0246943 | 6/2002 |
| WO | 2005083660 A1 | 9/2005 |
| WO | 2006098727 A1 | 9/2006 |
| WO | 2010136953 A1 | 12/2010 |

OTHER PUBLICATIONS

Aimin, Zhang et al., "A High-Resolution, Large-Screen Color Acpdp With Modular Structure", Chinese Journal of Liquid Crystals and Displays, http://en.cnki.com.cn/Article_en/CJFDTOTAL-YJYS601.005.htm, 1996, 2 pages.

Wareberg, P. G. et al., "Flat-panel video resolution LED display system", Proceedings of the National Aerospace and Electronics Conference, vol. 1, NAECON, 1982, 1 page.

* cited by examiner

100

400

500

600

700

1000

METHOD AND APPARATUS FOR PRESENTATION OF MEDIA CONTENT

FIELD OF THE DISCLOSURE

The subject disclosure relates to a method and apparatus for presentation of media content.

BACKGROUND

Media content is typically experienced by consumers via devices such as computers, televisions, radios, and mobile electronics. Media content can be delivered by service providers, who send the content, such as television, radio, and video programming, to consumers for enjoyment at their physical locations. Modern communications networks benefit from interconnectivity between consumers and various communication devices. As network capabilities expand, these interconnections can provide new opportunities to enhance the ability for consumers to enjoy media content by experiencing a variety of content over multiple devices. Intelligent devices offer means for the enjoyment of content in ways that anticipate consumer personalization of media content presentation.

BRIEF DESCRIPTION OF THE DRAWINGS

Reference will now be made to the accompanying drawings, which are not necessarily drawn to scale, and wherein.

DETAILED DESCRIPTION

Figure 1:
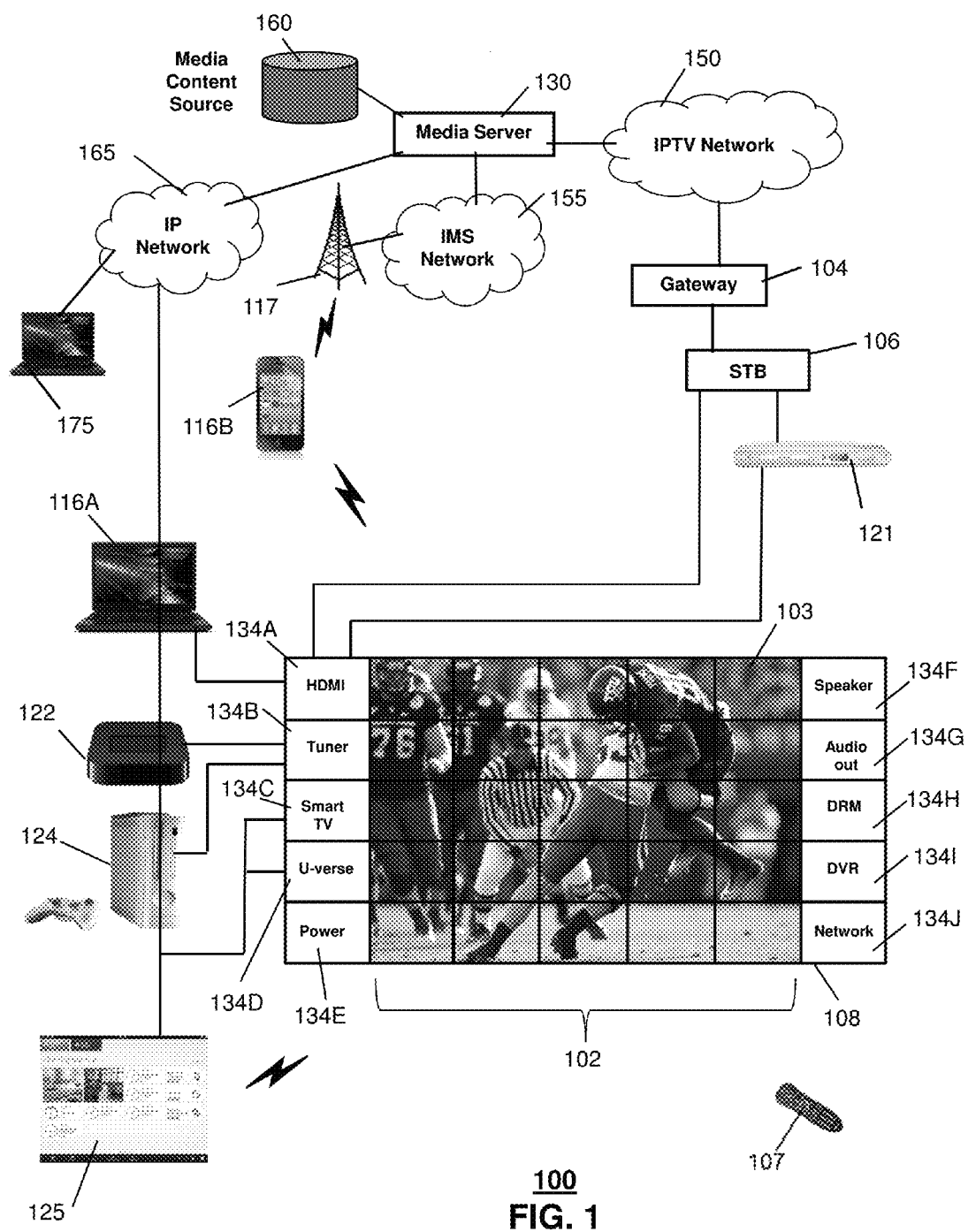
FIG. 1 depicts an illustrative embodiment of a system including a modular display device that can be utilized for presenting media content.

The subject disclosure describes, among other things, illustrative embodiments for a modular display device that can be constructed of a module array of display modules and functional modules that are movably assembled in the modular array. Other embodiments are described in the subject disclosure.

One or more aspects of the subject disclosure include display modules that can include bus connections on perimeter sides for allowing the display modules to be inserted and/or removed from the module array. Multicast video stream data can be transmitted to the display modules in the module array. Each display module can selectively receive video data from the multicast video stream that is relevant for the display module based on configuration information that specifies the location of the module in the module array. The modular display device can include functional modules for providing support functions to the module array, including power, network, and data streaming. Three-dimensional display modules facilitate modular display devices with designer edges, while the perimeter bus connectivity facilitates non-rectangular module arrays.

One embodiment of the subject disclosure can include a device comprising a video streaming module and a composite display comprising a plurality of display modules movably attached in a module array. Each display module can include a video display disposed on a front side of the display module, a memory to store executable instructions and video display data, and a processor communicatively coupled to the video display and the memory. The executable instructions, responsive to execution by the processor, can facilitate performance of operations for receiving configuration information from the video streaming module. The configuration information can define a module location for the display module. The executable instructions can also facilitate performance of operations for receiving a multicast video stream from the video streaming module. The executable instructions can further facilitate performance of operations for updating the video display data at the memory from the multicast video stream according to the module location of the display module and, in turn, presenting the video display data at the video display responsive to updating of the video display data.

One embodiment of the subject disclosure can include a device, including a video display disposed on a front side, a memory to store executable instructions and video display data, and a processor communicatively coupled to the video display, and the memory. The executable instructions, responsive to execution by the processor, can facilitate performance of operations including receiving configuration information from a video streaming module of the modular display device. The configuration information can define a module location for the display module in a module array of the modular display device. The executable instructions can also facilitate performance of operations for receiving a multicast video stream from the video streaming module. The executable instructions can further facilitate performance of operations for updating the video display data at the memory from the multicast video stream according to the module location. The updating can be synchronized to a master clock for the modular display device. The executable instructions can facilitate performance of operations for presenting the video display data at the video display responsive to the updating of the video display data.

One embodiment of the subject disclosure can include a method for receiving, by a system comprising a processor, a multicast video stream directed to an array of a plurality of display modules movably attached to a modular display. The method can also include extracting, by the system, video display data from the multicast video stream according to a location within the array of a first display module of the plurality of display modules. The method can further include updating, by the system, a video display of the first display module according to the video display data that is extracted from the multicast video stream, wherein the updating is synchronized to a master clock of the modular display.

FIG. 1 an illustrative embodiment of a system 100 that can be utilized for delivering media content for display at a modular display device 108. In one embodiment, the system 100 can be a subscription content service. For example, the subscription content service can be part of a cable, satellite, fiber optic, and/or DSL based media content delivery system. The media content can be any type of viewable content, such as broadcast television, cable or premium television, video on demand, or pay-per-per view television. In one embodiment, the system 100 can include one or more media servers 130 that can receive media content from one or more media content sources 160. Media servers 130 can provide media content to one or more delivery networks 150, 155, and 165. For example, a media server 130 can deliver media content services via an internet protocol television (IPTV) network 150, an internet protocol multimedia subsystem network 155, and/or an internet protocol network.

In one embodiment, media content can be routed to the IPTV network 150, which, in turn can deliver media content to a gateway device 104. In turn, the gateway device 104 can route media content to a media processor device 106, such as a set-top box. In another embodiment, the media server 130 can deliver media content by the IMS network 155 to a mobility network 117. The mobility network 117 can route media content to a mobile communication device 116B, such as a wireless smart phone, via a cellular, long term evolution (LTE), third generation (3G), and/or fourth generation (4G) wireless networks. In one embodiment, the mobile communication device 116B can route media content that is received over the mobility network 117 to the modular display device 108 by, for example, a mobile hotspot Wi-Fi link between the mobile communication device 116B and the modular display device 108. In another embodiment, the media server 130 can deliver media content over a public IP network 165. In turn, the IP network 165 can deliver media content to devices 116A, 122, 124, and 125. For example, the IP network 165 can delivery media content to a mobile computer device 116A, a streaming device 122, a gaming console 124, and/or a home security system 125. Devices 116A, 122, 124, and 125 that receive media content from the IP network 165 can, in turn, transmit the media content to the modular display device 108 via direct connection, such as a USB port, or via a wireless connection, such as Wi-Fi.

The system 100 can further include authentication functions to insure that media content is distributed only to verified subscribers of the system 100 (or media content sources accessed by the system 100) according to service plan levels of those subscribers. For example, the system 100 can verify that media processor device 106 is be properly identified and validated for receiving media content over the system 100. For example, an authentication server can be used to verify the subscription status of the media processor device 106. Device identifying information, such as MAC address, IP address, and/or SIM card information, can be transmitted to the authentication server. The authentication server can use this identifying information from the media processor device 106 to inquire at a subscriber database of service plan information for a subscriber who is associated with the device 106. The subscriber database can provide subscription status and service plan information to allow the authentication server to enable delivery of purchased media content to the media processor device 106. In one or more embodiments, the media content can be selected based on a number of techniques and criteria, such as based on user input, user preferences, user profiles, monitored user viewing history, and so forth.

In one embodiment, the gateway device 104 can function as an interface between the IPTV network 155 and the media processor device 106. In one embodiment, the gateway device 104 can provide internet working functions, such as protocol translation, impedance matching, data rate conversion, and/or fault isolation necessary for exchanging data between the IPTV network 150 and the home-based media processor device 106.

In one embodiment, the media processor device 106 can receive media content as encoded data packet streams and can decode the received data streams into decoded streams that can be delivered to the modular display device 108 for reproduction of video and audio content. In other embodiments, the media processor device 106 can further perform functions of providing an electronic programming guide for selection of programming from the media server 130, authentication of the media processor device 106 for reception of media content, storage and updating of user preferences, and/or parental control of media content. In one embodiment, the media processor device 106 can be configured with custom user settings to control operations of the program guide, such as channel display order, favorites, channel hiding, and operations of an internal digital video recorder function. In one embodiment, one or more aspects of customer user settings and/or programming stored on an internal digital video recorder function can be replicated at the IPTV network 105 or at a cloud-based storage location. In one embodiment, the functionality of the media processor device 106 can be integrated into the modular display device 108. In another embodiment, the media processor device 106 can be coupled to an external digital video recording device 121. In another embodiment, a digital video recording device 121 can deliver media content to the modular display device 108.

In several embodiments, the modular display device 108 can be a composite display device that is made up of function modules 134A-J and one or more module arrays 102 of display modules 103. In various embodiments, the function modules 134A-J can include modules for receiving, navigating, and decoding media content. For example, the function modules 134A-J can include interfaces for HDMI 134A, digital television tuning 134B, smart television 134C, and/or integrated media processing (U-Verse™) 134D. In various embodiments, the function modules 134A-J can include modules for power supply 134E, built in speakers 134F, audio interfacing 134G, digital rights management (DRM) 134H, digital video recording (DVR) 134I, and/or network interfacing 134J.

In one or more embodiments, the module array 102 of the modular display device 108 can include one or more display modules 103. The display modules 103 can be arranged in a variety of configurations, including a rectangular array, a square array, and/or a non-rectangular array. In one embodiment, the display modules 103 can include input-output connections on the perimeter sides of the modules 103. The input-output connections can be on more than one perimeter side of each display module 103 and can allow each display module 103 to be connected to a video data bus and a power supply bus. In one embodiment, the input-output connections can be identical on four sides of each display module 103. In this embodiment, the display module 103 can be placed anywhere into the module array 102 and will establish connectivity with buses of the modular display device 108 and with buses of other display modules 103 of the module array 102. Where display modules 103 are symmetrically configured, such as where the display modules 103 are squares, and the input-output connections on the perimeter sides of the display modules 103 are the same on each side of the display modules 103, then each display module 103 can be placed into the module array 102 in any rotational arrangement of 0°, 90°, 180°, 360°. If the display modules 103 are rectangular (non-square), then each display module 103 can be placed into the module array 102 in any rotational orientation of 0° and 180°.

In one or more embodiments, the function modules 134A-J and the display modules 103 can each comprise the same shape and size. For example if the display modules 103 are square shaped and sized 10 cm×10 cm, then the function modules 134A-J can also be square shaped and sized 10 cm×10 cm. By matching the size and shape of the function modules 134A-J and the display modules 103, the different types of modules fit into array (the module array 102 and a function array) and will connect easily, regardless of module orientation. In one embodiment, the function modules 134A-J and the display modules 103 can be of different sizes or aspect ratios and/or shapes. However, the differing sizes, ratios, and/or shapes can be selected so that the function modules and the display modules "fit together" at the perimeter side connectors. For example, the function modules 134A-J can be designed to be twice or three times as long or as wide as the display modules 103, or some other multiple, so that the function modules 134A-J and the display modules 103 not only fit with respect to the perimeter side connectors but also with respect to placement into the overall modular display device 108.

In one embodiment, the modular display device 108 can be a television device. In one embodiment, the modular display device 108 can include a digital television tuning module 134B for selecting from a set of input channels and tuning a selected channel. The set of channels can be provided to the modular display device 108 by a local source, such as but not limited to a media processor device 106, a digital video recorder device 121, a computer device 116A, a wireless mobile communication device 116B, a streaming media device 122, a gaming console device 124, and/or a home security system device 125. In one embodiment, the modular display device 108 can receive media content directly from the IP network 165. In one embodiment, the modular display device 108 can capture several different input signal types and/or protocols. For example, the input capture module can capture high-definition multimedia interface (HDMI), audio-visual (AV), composite component inputs, separate video (s-video), transmission control protocol/internet protocol (TCP-IP), wireless fidelity (Wi-Fi), wireless display (Wi-Di), wireless Bluetooth, wireless ZigBee, wireless HDMI, and/or digital coaxial cable. In one embodiment, the input capture module can scan several input channels for input signals. The input capture module can determine which, if any, of the input channels is currently connected to an active media source. For example, the input capture module can determine if an input source, such as the streaming device 122, is in turned ON and/or initialized to receive media content from the IP network 165.

In one or more embodiments, the modular display device 108 can receive a video signal at one or more functional modules 134A-D. In one embodiment, the received video signal can be a digital television signal that can be received at an antenna. The digital television signal can include media content that has been encoded and/or compressed. For example, the digital television signal can be television content that has been compressed using MPEG-2. In one embodiment, the digital television tuner 134B can receive a digital television signal and decompress and/or decode the digital television signal to extract uncompressed media content as an uncompressed video stream. In one embodiment, the received video signal can be a compressed video stream that is not from a digital television signal. For example, the received media signal can emanate from a media source in the network 100 that transmits the media signal over the network 100 as compressed video via packet transport. At the modular display device 108, a smart television interface 134C can decompress the received video signal to generate an uncompressed video stream. In one or more embodiments, the modular display device 108 can receive an uncompressed video signal at an HDMI interface 134A or a DVI interface.

In one or more embodiments, a video processing functional module 134A-D of the modular display device 108 can send an uncompressed video stream to all of the display modules 103 in the module array 102. In one or more embodiments, the video stream can be multicast to all of the display modules 103, such that all of the display modules 103 can receive the video stream at the same time. For example, each of the display modules 103 can be coupled to a video processing functional module 134A that can be the source for a multicast video stream. A device-wide video data bus can provide interconnectivity across the modular display device 108. This device-wide video data bus can began at the video processing functional modules 134A-D and cascade through the display modules 103 of the module array 102, where each display module 103 is coupled to and couples forward the video display bus to other display modules 103.

In one or more embodiments, each display module 103 can be configured to detect, receive, and update video data from the multicast and video data stream, where the video data is relevant to that display module 103. In one embodiment, the modular display device 108 can configure each display module 103 in the module array 102 such that each display module 103 can be assigned a specific location in the overall module array 102. For example, where the module array 102 includes a total of 25 individual display modules 103, and shown, then each display module 103 can be assigned one of 25 locations within the module array 102.

In one or more embodiments, the location assignments for the display modules 103 of the module array 102 can be performed by the video processing functional modules 134A-D. For example, an HDMI interface module 134A can assign the locations for each of the display modules 103. In one embodiment, the HDMI interface module 134A can be in communication with the display modules 103 of the module array 102 and can map display locations of each of the display modules 103 in the module array 102. Each display module 103 can determine the identity of adjacent display modules 103 in the module array 102. Display modules 103 can exchange identification tokens with other, directly coupled display modules 103. For example, a display module 103 at the rightmost corner of the module array 102 can exchange tokens with a first adjacent display module 103 to its left and a second adjacent display module 103 that is down the screen. This rightmost corner display module 103 can thereby determine its position relative to adjacent display modules 103 that are left screen and down screen and can determine that there are no adjacent display modules 103 that are up screen or right screen from its location. In one embodiment, a video processing function module 134A can send a multicast query to all of the display modules 103 of the modules array 102 requesting identification and location information for each display module 103. The video processing functional module 134A can use the identification and location information to map a layout of the module array 102 that has been created by placement of the display modules 103. In one or more embodiments, a mapping of the layout of the module array 102 can be provided by a user. For example a configuration function at the functional module 104 can provide a graphical interface for a user to enter the layout of the module array 102. In one or more embodiments, once a mapping of the module array 102 of the display modules 103 has been determined and or entered into one video processing functional module 134A, then each display module 103 can be identified to a specific location in the module array 102.

In one or more embodiments, the video processing functional modules 134A-D can segment the video data stream to correspond with the determined mapping of the display modules 103 in the module array 102. In the example shown, the functional module 104 can segment video data stream into 25 sections corresponding to the 25 display modules 103 of the module array 102. In one embodiment, if a row or column of the display modules 103 of the module array 102 is added or is deleted, the functional module 104 can account for a change in the number of and/or arrangement of display modules 103 in the module array 102 and can alter the way that the video data stream is segmented to account for these changes.

In one or more embodiments, each segment of the video data stream can be assigned to an identifier that corresponds to a specific display module 103 of the module array 102 of the modular display device 108. For example, a display module 103 at location "13" of the module array 102, where "13" corresponds to a display module 103 at a second column and a third row of the module array 102, can be identified as the "$13^{th}$" display module 103 of the module array 102. When the functional module 104 segments the video data in the video data stream into 25 segments, the $13^{th}$ segment can include the specific video data that is relevant to the $13^{th}$ location. Similarly, the video data stream is segmented so that the video data at each segment corresponds to the relevant data for a particular display module 103 at each location within the module array 102.

In one or more embodiments, the modular display device 108 can include several video processing functional modules 134A-D, each of which can map the display area of the module array 102 independently. For example, an HDMI interface module 134A that receives an uncompressed video data stream from, for example, a media processor device 106, can map uncompressed video data stream to the module array 102 such that a display area is defined that is five columns wide and four columns high. The top row of display modules 103 can be used for displaying information other than video. For example the top row of display modules 103 can be used for displaying programming guide information, search information, Internet navigation information, and/or other visual information. The remaining display area can be used to display the video data stream. In one embodiment, the HDMI interface module 134A can segment the uncompressed video data stream into 20 segments corresponding to the 5×4 display area. In one or more embodiments, a smart television module 134C, can independently defined a different display area in the module array 102. For example, the smart television module 134C can map the display area to the entire module array 102.

In one or more embodiments, the display modules 103 of the module array 102 can receive a multicast video data stream from one or more of the video processing functional modules 134A-D. Each display module 103 can extract from the multicast video data stream one or more segments that are relevant to the display module 103 given its location in the module array 102. In one or more embodiments, each display module 103 in the module array 102 can store the extracted segment in video memory local to the display module 103 and update video display pixels according to the updated data. In one or more embodiments, each of the display modules can be updated at the same time according to a master clock for the modular display device 108. The master clock can be propagated across the module array 102 using the perimeter side connections and data bus of the display modules 103. By updating all of the display modules 103 at the same time, the modular display device 108 can respond immediately to changes in the video stream images without encountering scanning delays. In a typical television device, incoming video data must be scanned to the pixel array, where the pixels are all tied together, and where the scanning must conform to long-standing television standards.

In one or more embodiments, the modular display device 108 can be extendable to serve any type of video-based application, including computer, television, and/or display signage. The modular display device 108 can be an extendable module with a "starter kit" of one or more display modules 103 and one or more functional modules 134A-J, such as a power module 134E and at least one video processing functional module 134A. The starter kit can be expanded by adding, for example one or more display modules 103 to construct a module array 102 of any dimension. For example, a starter kit of one display module 103 can be extended to an n×m module array 102 that covers a large display area. In another example, a starter kit of one video processing functional module 134A can be expanded to include several one video processing functional modules 134A-D and/or additional functional modules 134F-J to add functions for network, digital recording, and the like.

In one or more embodiments, display modules 103 of the modular display device 108 can include a display, central processing unit (CPU), memory, data bus interconnectivity, and/or power connectivity. Each display module 103 can stand alone as a single element module array 102 in the modular display device 108. In one embodiment, each display module 103 can include a power supply interface capable of connectivity with a standalone power supply, such as an AC/DC transformer. In this configuration, a display module 103 of the modular display device 108 can be used as a standalone device, separate from the function modules 134A-J of the modular display device. For example, the display module 103 can be used as a display for a docking station and/or a mobile communication device when not in use in the modular display device 108.

In one or more embodiments, the display modules 103 can receive uncompressed video content from any of four directions (left, right, upwards, and downwards). The incoming video data stream can be distributed to the entire module array 102, at once, using multicasting and the master clock to strobe the entire data bus. In one embodiment, each display module 103 can understand its function and relationship to the other bricks in the mapping of the module array 108. Each display module 103 can extract from the strobed video data stream only the segment of the data stream that is relevant to the display module's mapped location. Multicasting of the content can improve video quality for the modular display device 108 by eliminating full scanning of the module array 102. In one embodiment, the display modules 103 can be configured to only refresh when the content in their segment changes. If the content does not change for the segment, then the display module 103 does not need to be refreshed. An infinite refresh time can be achieved.

In one or more embodiments, the modular display device 108 does not require a true central controller as is used in large-scale matrix signs. Each display module 103 includes sufficient intelligence to know not only its location within the mapped module array but to also selectively extract only relevant video data from the uncompressed video stream that is propagated to the module 102. Each display module 103 can be updated at a common time using a master clock for the modular display device 108. In one embodiment, each display module 103 can refresh its display according to a refresh time (60 Hz, 120 Hz) and policy controlled at display module 103.

Figure 2:
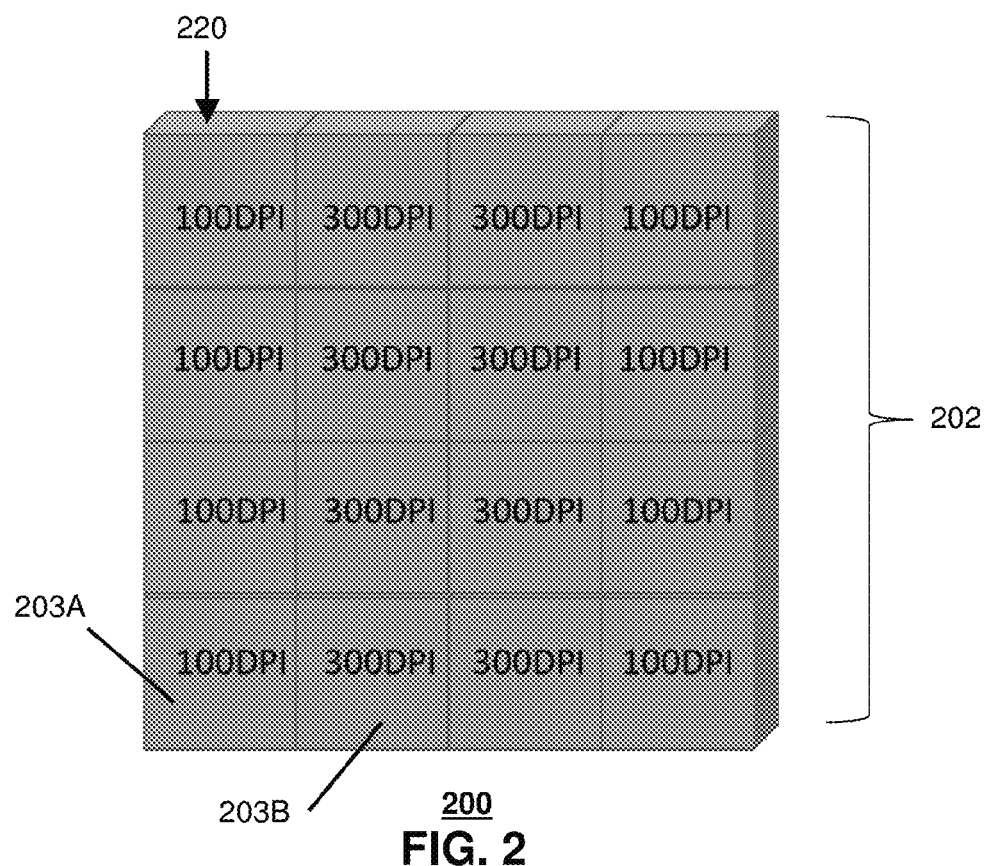
FIG. 2 depicts an illustrative embodiment of a system including a module array for a modular display device depicting display modules of differing densities.

FIG. 2 depicts an illustrative embodiment of a system including a module array 202 for a modular display device depicting display modules of differing densities. In one or more embodiments, a module array 202 can include display modules 203A-B having more than one display density. For example, the module array 202, as shown, includes a combination of 100 dots per inch (DPI) and 300 DPI display modules 203A-B. In one or more embodiments, each display module 203A-B can receive the uncompressed video content that is multicast to the all of the display modules 203A-B in the module array 202. Each display module 203A-B knows its own DPI resolution and can reproduce the video content for its segment in the mapped module array 202 according to its DPI. In one embodiment, individual display modules 203A-B can be replaced or upgraded to a different DPI. In one or more embodiments, display modules 203A-B can compensate for differences in DPI of adjacent modules and/or specified modules. For example, a high DPI display module 203B can be adjacent to a low DPI display module 203A. Without compensation, the resolution difference between the adjacent display modules 203A-B can appear noticeable. In one or more embodiments, the higher DPI display module 203B can soften its display resolution, via software, by blurring image pixels in one or more areas of the display to mimic the resolution of the lower DPI display module 203A. For example, the higher DPI display module 203B can reduce resolution along the edges of the higher DPI display module 203B that are adjacent to, or abut, edges of the lower resolution DPI display module 203A. In one embodiment, the softening adjacent edges can be performed at a video processing functional modules 134A, such that the multicast video stream data is softened or compensated prior to reception at the high DPI display module 203B.

In one or more embodiments, the display modules 103 of the modular display device 108 can include a genderless data/power bus. The data/power bus can be disposed on the perimeter sides 220 of the display modules 203A. In one embodiment, each perimeter side 220 of each display module 203A can include the data/power bus such that the display module 203A can be inserted anywhere in the module array 202 and propagate the data and power signals in every direction such that entire module array 202 is serviced. In one or more embodiments, the data/power bus connections can be genderless. All connectors and connections can be the same, without "male" or "female" connections. This can facilitate any arrangement and ordering of the display modules 203A in the module array 202 without consideration for aligning male and female connectors. In one or more embodiments, the connectors can be metal and/or a conductive material. In one embodiment, the connections can be completed via optical and/or near field and/or wireless techniques.

Figure 3:
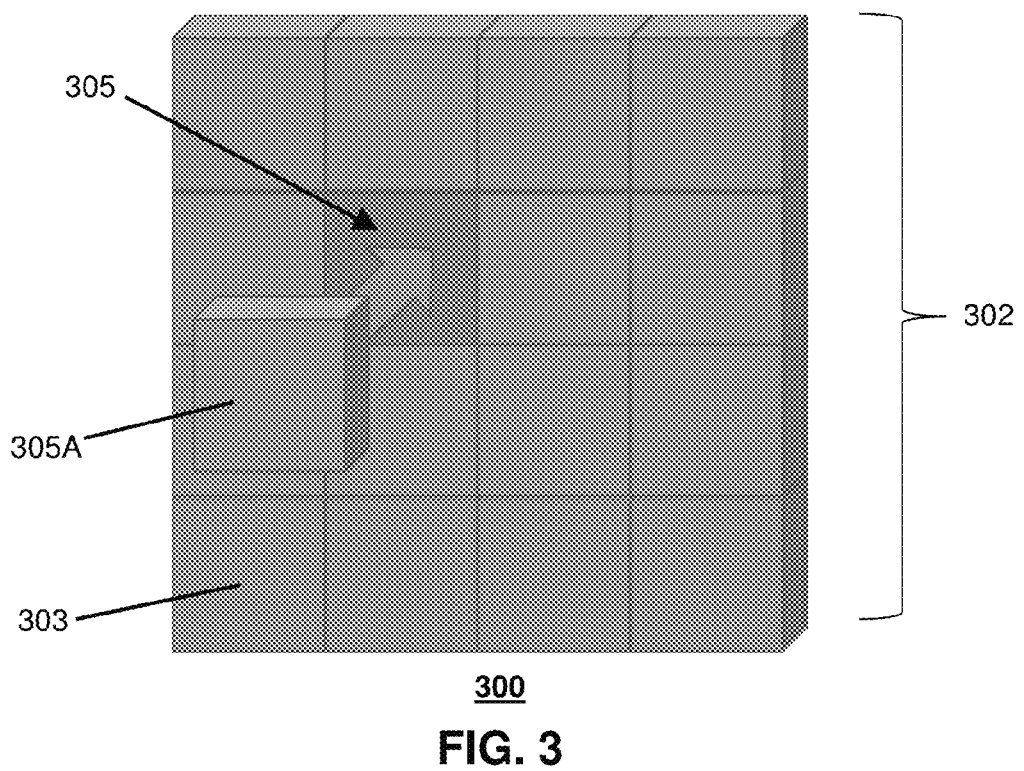
FIG. 3 depicts an illustrative embodiment of a system including a module array 302 for a modular display device depicting replacement of a display module.

FIG. 3 depicts an illustrative embodiment of a system including a module array for a modular display device depicting replacement of a display module. In one or more embodiments, as display modules 303 in the module array 302 wear, degrade, and/or fail, individual display modules 303 can be replaced with new display modules 305A without replacing the entire display modular display device 108. Smaller physical displays can have higher manufacturing yields, which can result in lower costs/higher profit margins. Therefore, as compared to a large, monolithic display, a same-size modular display 108 can be manufactured for less money and with less environmental impact due to avoidance of scrap. In addition, the modular display device 108 can be whole more reliable and more able to withstand wear and tear.

Figure 4:
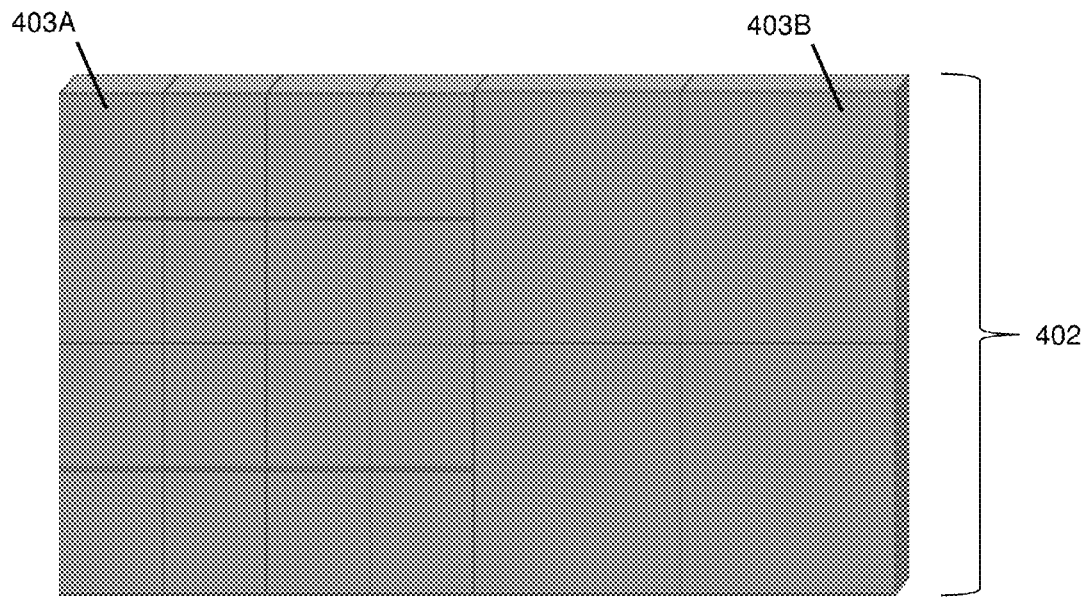
FIG. 4 depicts an illustrative embodiment of a system including a module array for a modular display device depicting display modules of differing display sizes.

FIG. 4 depicts an illustrative embodiment of a system including a module array for a modular display device depicting display modules of differing display sizes. In one or more embodiments, multiple "standard" module sizes are possible. For example, the module array 402 can include two sizes of display modules 403A and 403B. As the desired module array 402 gets larger, it can be more appropriate to use a smaller number of large display modules 405B rather than a larger number of small display modules 405A. In one or more embodiments, each display module 403A-B can distribute video data from its assigned segment of the multicast video stream according to the aspect ratio and size of the display module 403A-B.

Figure 5:
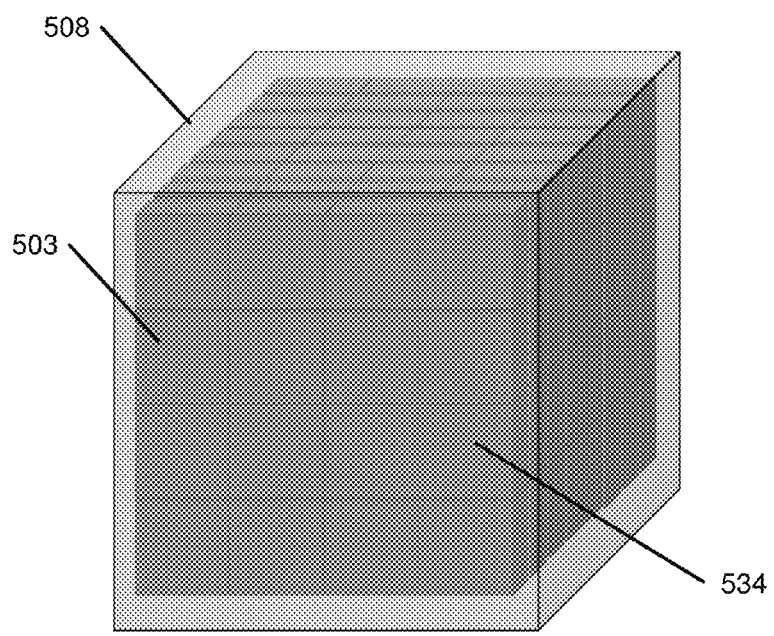
FIG. 5 depicts an illustrative embodiment of a system including display modules for a modular display device depicting packaging for display modules, blocks, or bricks.
Figure 6:
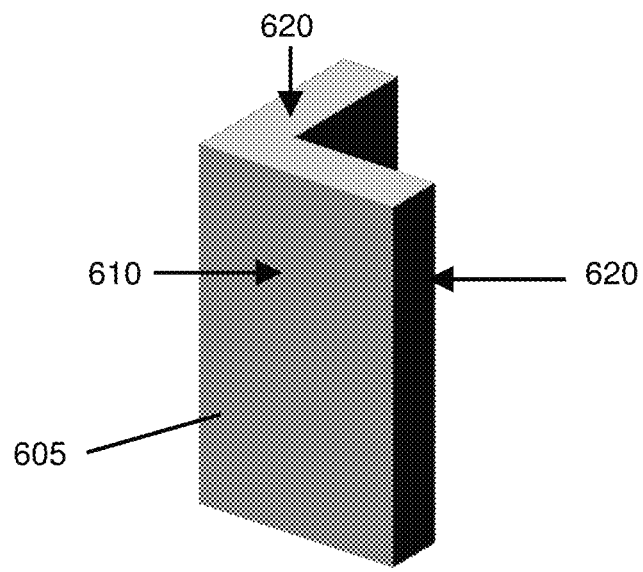
FIGS. 6-9 depict an illustrative embodiment of a system including a various shapes of display modules.
Figure 7:
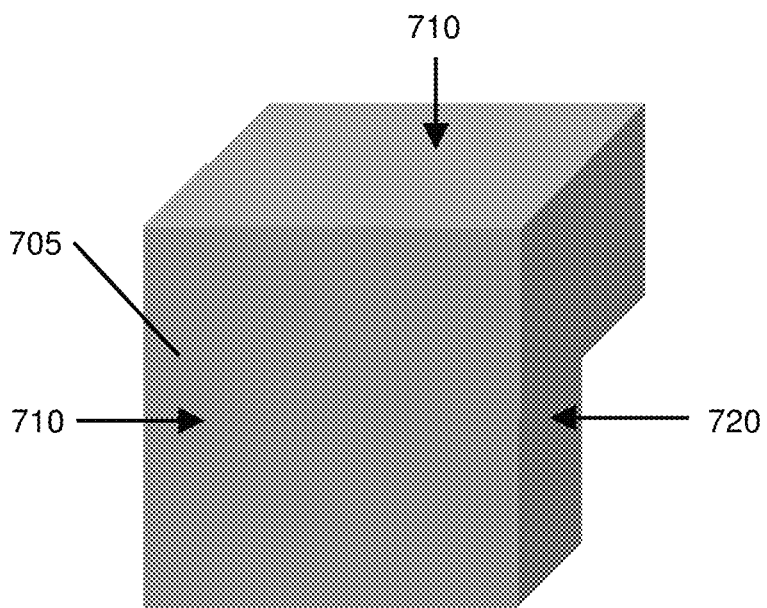
Figure 8:
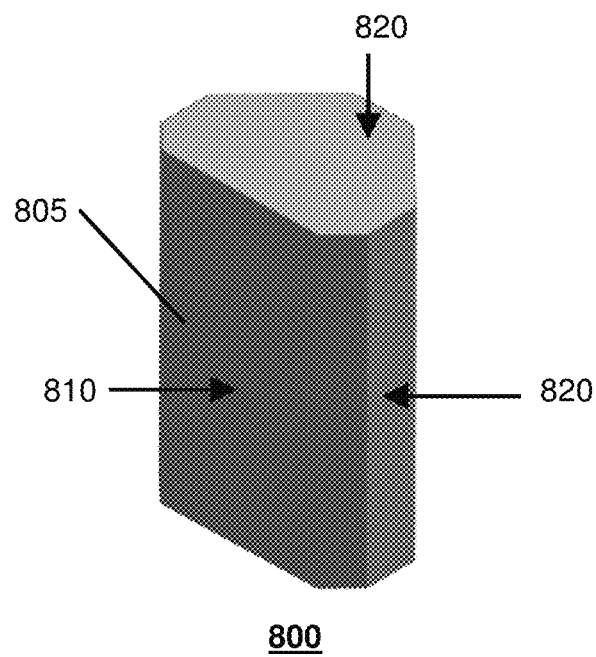
Figure 9:
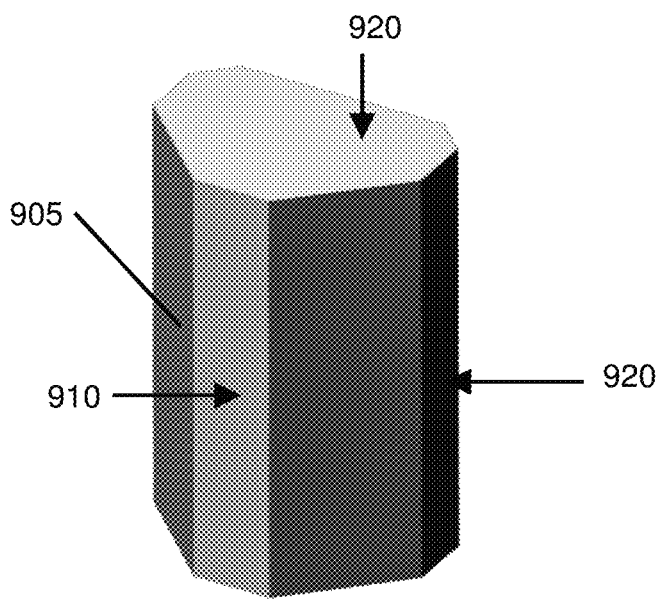

FIG. 5 depicts an illustrative embodiment of a system including display modules for a modular display device depicting packaging 500 for display modules or bricks. In one or more embodiments, display modules 503 can be made available for purchase for addition and/or replacement in modular display devices 108. In one embodiment, display modules 503 can be packaged and shipped in standard lots that capitalize on the simple module design. For example, the display modules 503 can be packaged in shipping containers 508 that can house the modules in a three-dimensional array of modules. Typical display devices are designed to be thin and wide and are difficult to package, require a great deal of protective packaging material, and, nevertheless, are subject to breakage during shipping and handling. By comparison, the display modules 503 of the modular display device 108 can present a more consistent aspect ratio between length, width, and height, which makes for tighter packaging density, reduced packaging material requirements, and less breakage. In one or more embodiments, modular display devices 108 can be shipped in a single container 508 that takes advantage of the symmetric shapes of all the display modules 503 and functional modules 534. Display modules 503 and/or functional modules 534 can be packaged and sold as single module or multiple module additions to a basic modular display device package.

As display modules 503 and/or functional modules 534 are added, these can be placed into a frame at the installation location.

FIGS. 6-9 depict an illustrative embodiment of a system including a various shapes of display modules. For specialized installations, additional shapes may be introduced. In one or more embodiments, display modules 605, 705, 805, and 905 can be formed in a variety of shapes that provide three-dimensional conformity and aesthetic interest. For example, a sharp edged display module 605 can provide display surfaces 610 on two lateral outer edges while hiding the perimeter side connections 620. A sharp corner display module 705 can provide a similar display utility for top and side display edges 710 with perimeter side connections 720. In other examples, convex display modules 805 provide a display surface 810 and perimeter side connections 820, where the concave modules 805 are useful for constructing convex, three-dimensional display objects. Concave display modules 905 provide a similar display surfaces 910 and perimeter side connections 920 for constructing concave, three-dimensional display objects. In one or more embodiments, display modules 103 can be constructed with flexible materials that allow the display modules 103 to be flexed or manipulated to conform to desired curves of shapes.

Figure 10:
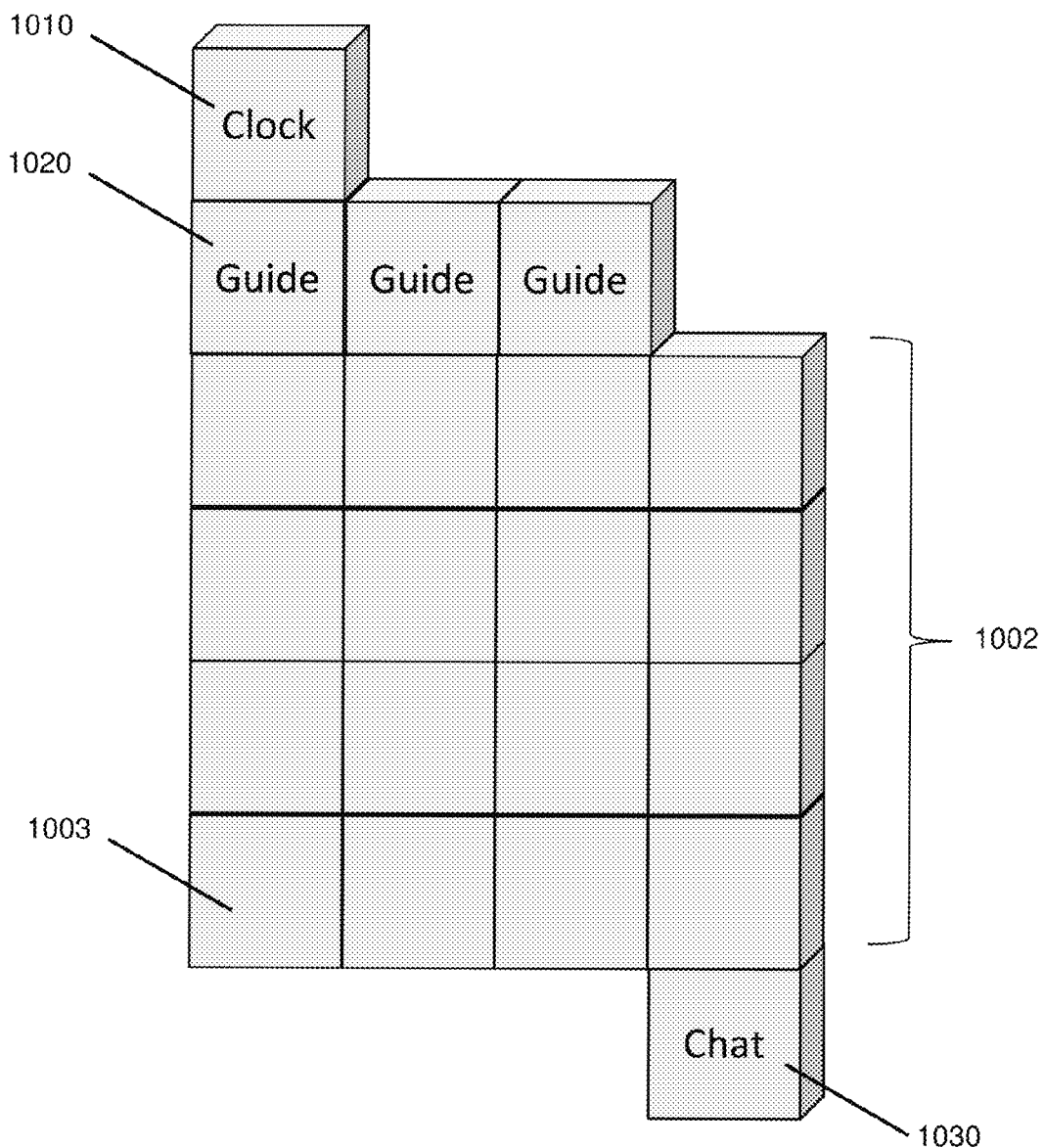
FIG. 10 depicts an illustrative embodiment of a system including a modular display device depicting a non-rectangular screen made up of display modules.

FIG. 10 depicts an illustrative embodiment of a system including a modular display device depicting a non-rectangular screen made up of display modules. In one or more embodiments, non-rectangular screens may be built out of module arrays 1002 of display modules 1003. In one embodiment, the uncompressed video stream can be scaled to fit the layout of the irregularly-shaped modular display device 1000. A video processing functional module 134A can segment the uncompressed video stream to map segmented portions to display modules 1003 as desired. For example, where the display area of the modular display device 1000 is non-rectangular, some segments of the video stream can be left unassigned, such that this video data is not presented. In one or more embodiments, the modular display device 1000 can be mapped as a series of rectangular screens. For example, in the illustrated embodiment, a main display area 1002 can be a large rectangular module array, while another rectangular array of display modules 1020 can serve as a programming guide display area, another display module 1010 can serve as a clock display, and another display module 1030 can present chat information.

In one or more embodiments, octagonal and/or triangular display modules could be constructed. These non-rectangular display modules can be used to construct modular display devices that take on non-rectangular two-dimensional and/or three-dimensional shapes. For example, non-rectangular display modules can be used to construct round or sphere modular display devices. The spherical surface can be used to create a convex display or a concave display. Panoramic views can be displayed across a single, large modular display device or a series of such devices.

Figure 11:
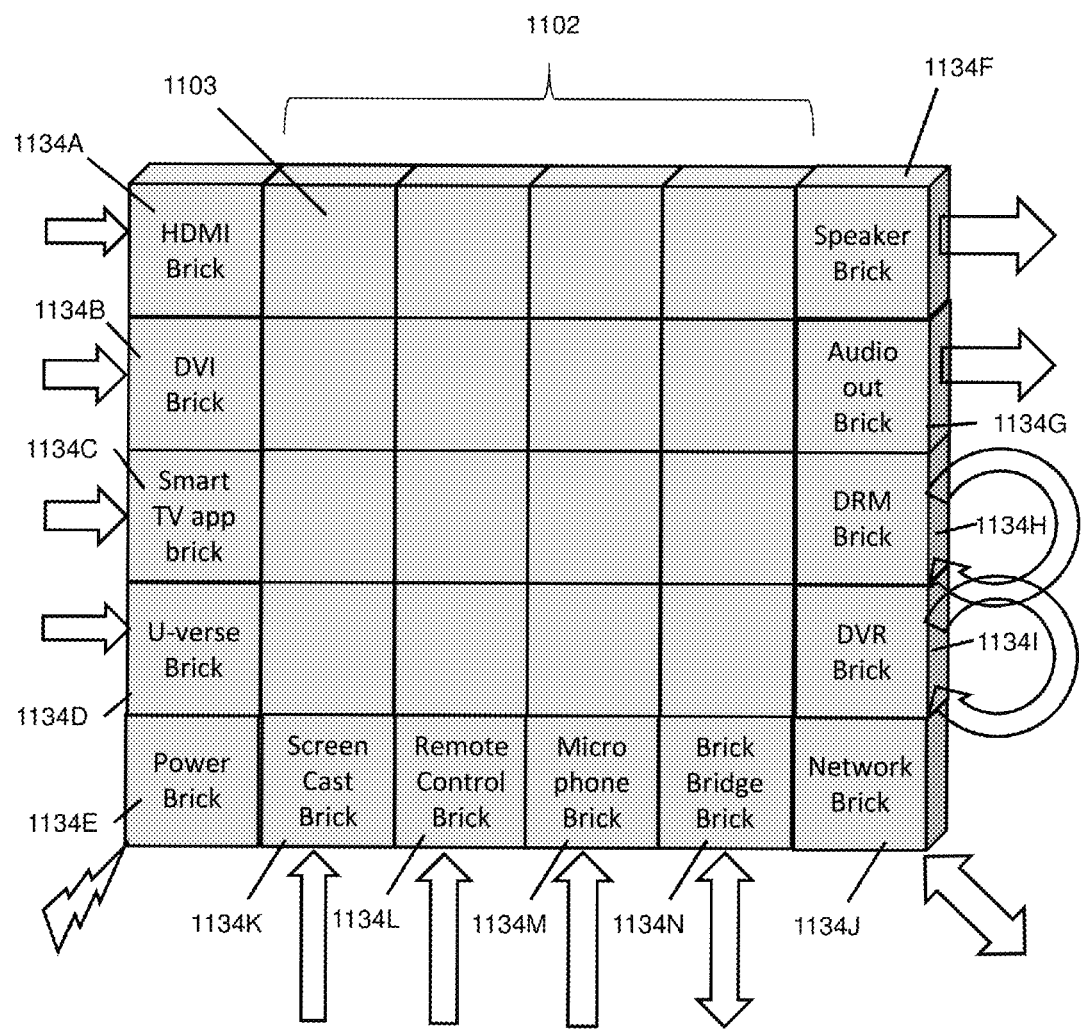
FIG. 11 depicts an illustrative embodiment of a system including a modular display device depicting a module array and various function modules.

FIG. 11 depicts an illustrative embodiment of a system including a modular display device 1100 depicting a module array 1102 and various function modules 11134A-N. In several embodiments, the modular display device 1108 can be a composite display device that is made up of function modules 1134A-N and one or more module arrays 1102 of display modules 1103. In various embodiments, the function modules 1134A-N can include modules for receiving, navigating, and decoding media content. For example, the function modules 1134A-N can include interfaces for HDMI 1134A, DVI 1134B, smart television 1134C, and/or integrated media processing 1134D. In various embodiments, the function modules 1134A-N can include modules for power supply 1134E, built in speakers 1134F, audio interfacing 1134G, digital rights management (DRM) 1134H, digital video recording (DVR) 1134I, and/or network interfacing 1134J. In various embodiments, the function modules 1134A-N can include modules for screen casting 1134K, remote control interfacing 1134L, microphone interfacing 1134M, and/or brick bridging N.

In various embodiments, function modules 1134A-N specifically provide capabilities for receiving content from common and future external sources, decoding content into uncompressed video streams, transmitting these streams across the display bus via multicasting, and consuming decoded content. In various embodiments, the functions modules 1134A-N can provide bidirectional services. In one embodiment, the function modules 1134A-N can bridge multiple, discontiguous groupings of display modules 1103 together as a single service. While the various function modules 1134A-N are shown as the same size as each display module 1103 and as every other function module, the functions modules 1134A-N can be of different sizes and/or can be combined into multiple function modules.

In one or more embodiments, the modular display device 1100 can provide a pluggable architecture with nearly infinite possible variations. In one embodiment, the network interface 1134J and bridge interface 1134N can be used to bridge a first modular display device 1100 to a second modular display device. In one embodiment, the network interface 1134J and the power module 1134E can be integrated into a remote control.

In one or more embodiments, a modular display device 1100 can be portably mounted such that the modular display device 1100 can be moved or can be taken along on vacation. For example, a large modular display device 1100, with a varied assortment of functional modules 1134A-N and a large module array 1102 can be mounted on a wall for daily use. When the user decides to take a vacation, a portion of the modular display device 1100 can be taken along on the trip. For example, the user can simply remove a few critical functions modules, such as the power module 1134E, HDMI interface 1134A, built-in speakers 1134F, and one or more display modules 1103, to assemble a useful travel-ready modular display device.

In one or more embodiments, the power module 1134E can include a power converter for converting an AC voltage source input into a DC voltage source for powering the modular display device 1100. Power conversion can be accomplished within the power module 1134E, for example, using an AC/DC transformer and/or a rectifying power supply circuit. In this configuration, the power module 1134E can use an external AC source to provide a power supply for all of the modules in the modular display device 1100. In one or more embodiments, the power module 1134E can accept a DC power input and regulate this DC power into a power supply signal suitable for powering the modular display device 1100. For example, a DC power supply, such as a vehicular battery-based system or a lithium ion power cell system, can be coupled to the power module 1134E. The power module 1134E can include a regulator and/or signal conditioning and/or surge protection system for providing a filtered and safe DC power supply to the modules of the modular display device 1110 from either an AC or a DC power source.

In one or more embodiments, the power module 1134E can include a battery. The battery can serve as a back-up DC power source for the modular display device 1100 to enable remote operation of the modular display device 1100 in the absence of an external power source. In one embodiment, the battery can be rechargeable and the power module 1134E can include a charging system for storing power into the battery. In one embodiment, the battery can be a replaceable, non-chargeable item that can be installed into the power module 1134E when needed.

In one or more embodiments, the modular display device 1100 can include several power modules 1134E or can include power modules 1134E with differing capabilities. For example, the modular display device 1100 can include a first power module 1134E that is only capable of operation when supplied with an external power source, such as from an AC supply. A second power module 1134E can include an internal power source, such as a rechargeable battery, where the second power module 1134E can be used for remote operation of the modular display device 1100.

In one or more embodiments, one or more of the modules in the modular display device 1100 can include their own power sourcing capacity. For example, display modules 1103 and/or function modules 1134A-N can include a capability for connection to an external power source, such as an AC-to-DC transformer and/or an external battery source. A display module 1103 and an HDMI module 1134A could be combined to provide a portable video display system without requiring the power module 1134E, where either the display module 1103 or the HDMI module 1134A can receive an external DC power supply and then share that power supply with the other module. Other combinations can be used to create "sub-systems" of the module display device 1100. In one or more embodiments, one or more modules in the modular display device 110 can include their own power storage. For example, display modules 1103 and/or function modules 1134A-N can include battery, rechargeable batteries, capacitor-based storage, or other power storage devices to all the modules to operate in the absence of the power module 1134E and/or an external power source.

Figure 12A:
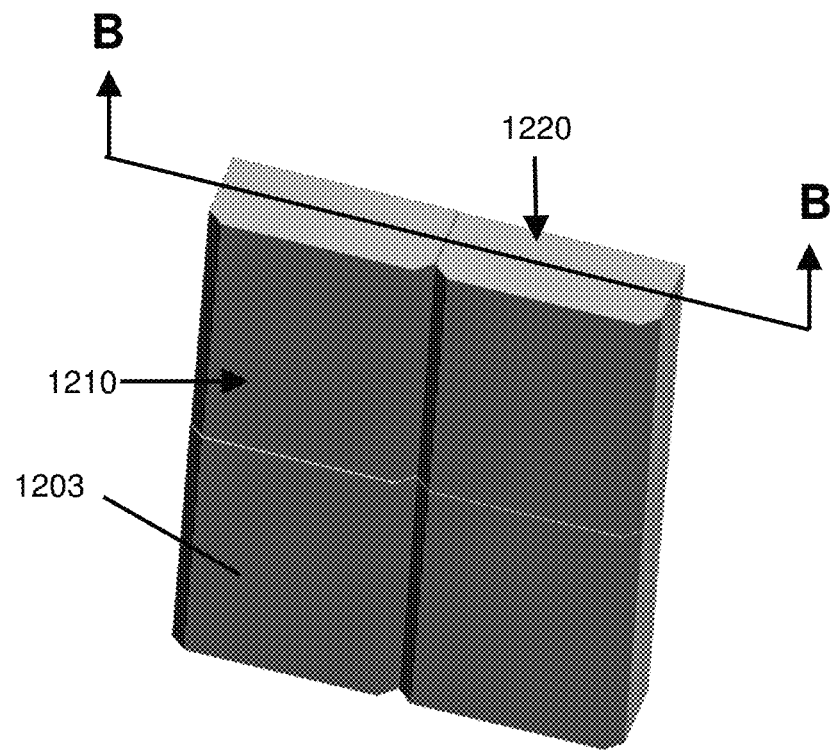
FIGS. 12A-B depicts an illustrative embodiment of a system including bezel-less display modules for a modular display device.
Figure 12B:
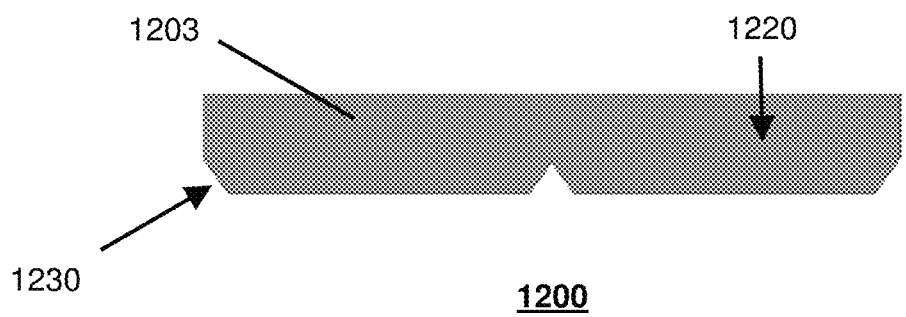

FIGS. 12A-B depicts an illustrative embodiment of a system including bezel-less display modules for a modular display device. In one or more embodiments, a simple example of display modules 1203 incorporating a bezel-less design is shown. In the bezel-less design, the outside edges 1230 of each display module 1203 are slightly angled. As a result, the edge-to-edge connections at the perimeter side edges 1220 are formed beyond the viewing angle of a viewer. The resulting grid of display modules 1203 presents a seamless visual surface. As shown in the cross section, the edges 1230 can be slightly beveled. In another embodiment, the edges can be curved.

Figure 13:
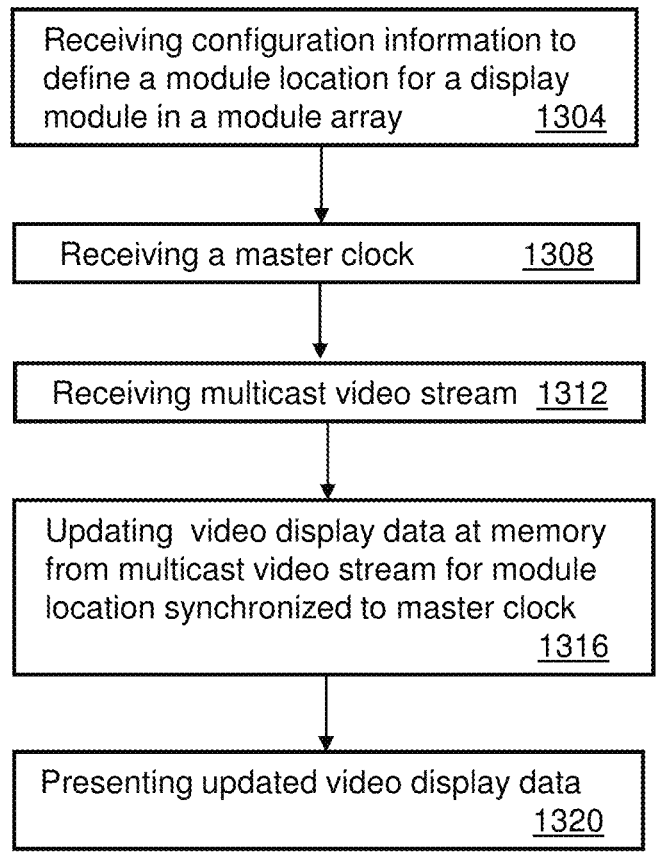
FIG. 13 depicts an illustrative embodiment of a method used in portions of the systems described in FIGS. 1 through 12B.

FIG. 13 depicts an illustrative embodiment of a method used in portions of the systems and devices described in FIGS. 1 through 12B. In one or more embodiments, at step 1304, configuration information can be received at display modules to define location for the display modules within a module array of a modular display device. In one embodiment, the location information can be mapped into the modular display device at one or more video function modules that can provide uncompressed video streaming to the display modules within the module array. In one embodiment, each display module can provide location information to a video function module by determining any adjacent display modules. In one embodiment, the display module can be identified to a numbered segment location.

In one or more embodiments, at steps 1308 and 1312, the display modules can receive a master clock and a multicast video stream from a video function module. In one embodiment, the master clock and multicast video stream are coupled to each of the display modules via a data/power bus that couples to and through each display module at perimeter side connections. In one embodiment, each display module extracts relevant video data from the multicast video stream based on the segment location identifier for that display module.

In one embodiment, at step 1316, the display modules update their display memory at the same time, synchronized to the master clock. In one embodiment, at step 1320, the display modules present the updated video display data.

Figure 14:
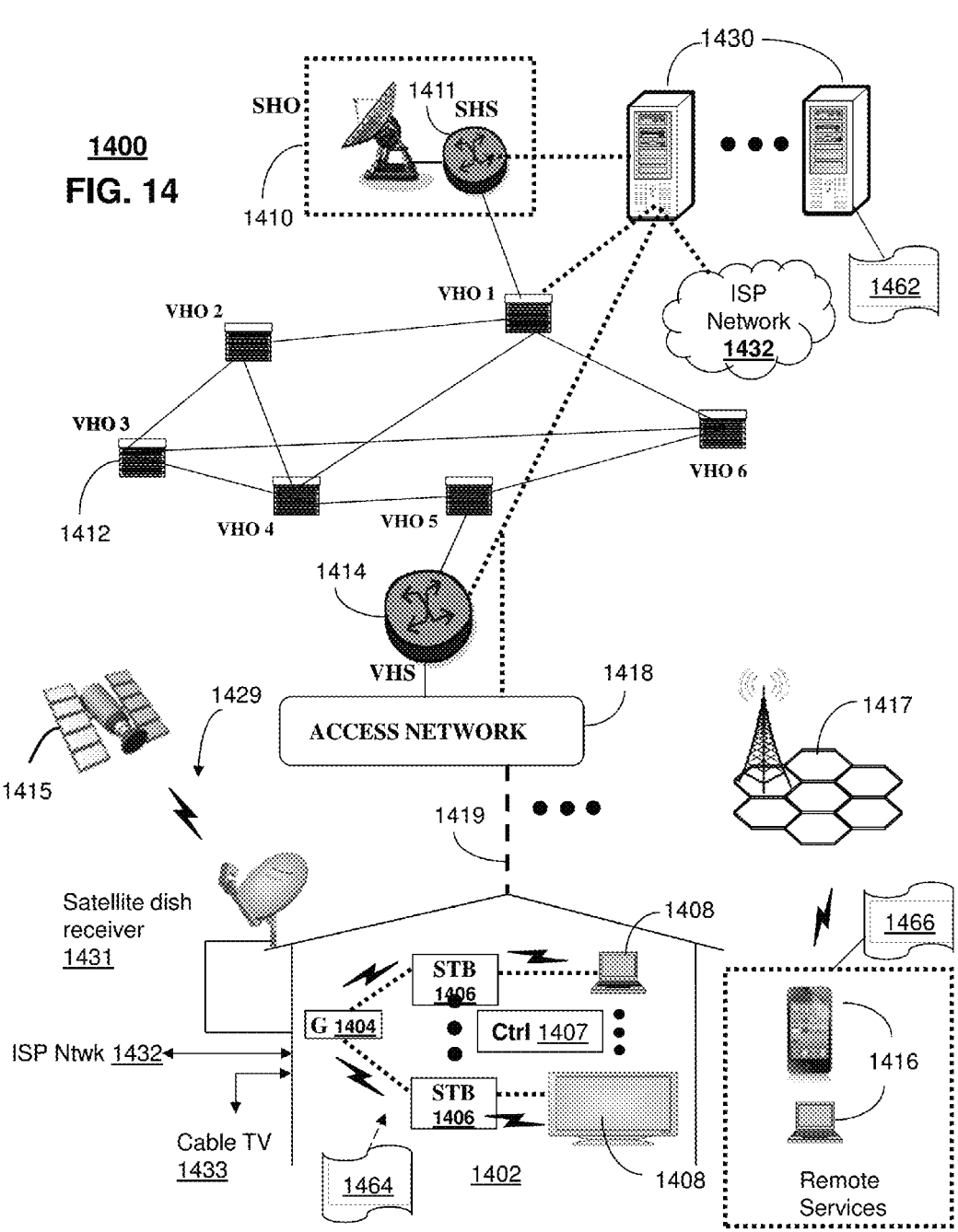
FIGS. 14-15 depict illustrative embodiments of communication systems that provide media services for the display modules and modular display devices of FIGS. 1 through 12B.

FIG. 14 depicts an illustrative embodiment of a first communication system 1400 for delivering media content. The communication system 1400 can represent an Internet Protocol Television (IPTV) media system. Communication system 1400 can be overlaid or operably coupled with systems 100-1200 of FIGS. 1-12B as another representative embodiment of communication system 1400. For instance, one or more devices illustrated in the communication system 1400 of FIG. 14 can be a modular display device for displaying a video stream. The modular display device 108 can be constructed from a module array 102 of display modules 103. The display modules can receive a multicast stream of video, where the display modules can be updated simultaneously.

The IPTV media system can include a super head-end office (SHO) 1410 with at least one super headend office server (SHS) 1411 which receives media content from satellite and/or terrestrial communication systems. In the present context, media content can represent, for example, audio content, moving image content such as 2D or 3D videos, video games, virtual reality content, still image content, and combinations thereof. The SHS server 1411 can forward packets associated with the media content to one or more video head-end servers (VHS) 1414 via a network of video head-end offices (VHO) 1412 according to a multicast communication protocol.

The VHS 1414 can distribute multimedia broadcast content via an access network 1418 to commercial and/or residential buildings 1402 housing a gateway 1404 (such as a residential or commercial gateway). The access network 1418 can represent a group of digital subscriber line access multiplexers (DSLAMs) located in a central office or a service area interface that provide broadband services over fiber optical links or copper twisted pairs 1419 to buildings 1402. The gateway 1404 can use communication technology to distribute broadcast signals to media processors 1406 such as Set-Top Boxes (STBs) which in turn present broadcast channels to media devices 1408 such as computers or television sets managed in some instances by a media controller 1407 (such as an infrared or RF remote controller).

The gateway 1404, the media processors 1406, and media devices 1408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 1406 and subsystems of the IPTV media system for services such as video-on-demand (VoD), browsing an electronic programming guide (EPG), or other infrastructure services.

A satellite broadcast television system 1429 can be used in the media system of FIG. 14. The satellite broadcast television system can be overlaid, operably coupled with, or replace the IPTV system as another representative embodiment of communication system 1400. In this embodiment, signals transmitted by a satellite 1415 that include media content can be received by a satellite dish receiver 1431 coupled to the building 1402. Modulated signals received by the satellite dish receiver 1431 can be transferred to the media processors 1406 for demodulating, decoding, encoding, and/or distributing broadcast channels to the media devices 1408. The media processors 1406 can be equipped with a broadband port to an Internet Service Provider (ISP) network 1432 to enable interactive services such as VoD and EPG as described above.

In yet another embodiment, an analog or digital cable broadcast distribution system such as cable TV system 1433 can be overlaid, operably coupled with, or replace the IPTV system and/or the satellite TV system as another representative embodiment of communication system 1400. In this embodiment, the cable TV system 1433 can also provide Internet, telephony, and interactive media services.

The subject disclosure can apply to other present or next generation over-the-air and/or landline media content services system.

Some of the network elements of the IPTV media system can be coupled to one or more computing devices 1430, a portion of which can operate as a web server for providing web portal services over the ISP network 1432 to wireline media devices 1408 or wireless communication devices 1416.

Communication system 1400 can also provide for all or a portion of the computing devices 1430 to function as a media server (herein referred to as server 1430). The server 1430 can use computing and communication technology to perform function 1462, which can include among other things, providing media content to a modular display device 108. For instance, function 1462 of server 1430 can be similar to the functions described for servers 130 of FIG. 1 in accordance with method 1300. The media processors 1406 and wireless communication devices 1416 can be provisioned with software functions 1462 and 1466, respectively, to utilize the services of server 1430. For instance, functions 1462 and 1466 of media processors 1406 and wireless communication devices 1416 can be similar to the functions described for the communication devices 106 of FIG. 1 in accordance with method 1300.

Multiple forms of media services can be offered to media devices over landline technologies such as those described above. Additionally, media services can be offered to media devices by way of a wireless access base station 1417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 15:
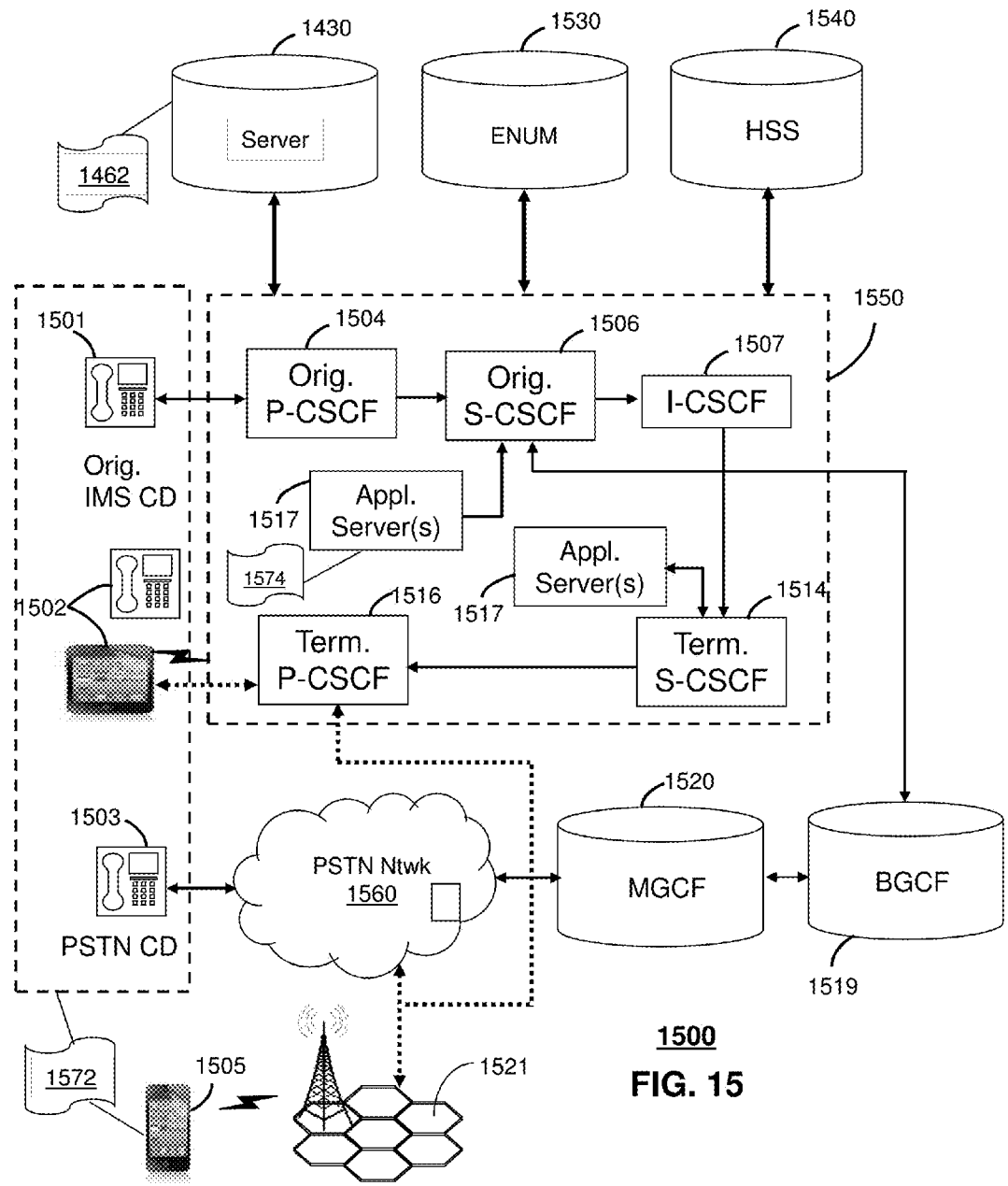

FIG. 15 depicts an illustrative embodiment of a communication system 1500 employing an IP Multimedia Subsystem (IMS) network architecture to facilitate the combined services of circuit-switched and packet-switched systems. Communication system 1500 can be overlaid or operably coupled with system 100-1200 of FIGS. 1 through 12B and communication system 1400 as another representative embodiment of communication system 1400. For instance, one or more devices illustrated in the communication system 1500 of FIG. 15 can be a modular display device for displaying a video stream. The modular display device 108 can be constructed from a module array 102 of display modules 103. The display modules can receive a multicast stream of video, where the display modules can be updated simultaneously.

Communication system 1500 can comprise a Home Subscriber Server (HSS) 1540, a tElephone NUmber Mapping (ENUM) server 1530, and other network elements of an IMS network 1550. The IMS network 1550 can establish communications between IMS-compliant communication devices (CDs) 1501, 1502, Public Switched Telephone Network (PSTN) CDs 1503, 1505, and combinations thereof by way of a Media Gateway Control Function (MGCF) 1520 coupled to a PSTN network 1560. The MGCF 1520 need not be used when a communication session involves IMS CD to IMS CD communications. A communication session involving at least one PSTN CD may utilize the MGCF 1520.

IMS CDs 1501, 1502 can register with the IMS network 1550 by contacting a Proxy Call Session Control Function (P-CSCF) which communicates with an interrogating CSCF (I-CSCF), which in turn, communicates with a Serving CSCF (S-CSCF) to register the CDs with the HSS 1540. To initiate a communication session between CDs, an originating IMS CD 1501 can submit a Session Initiation Protocol (SIP INVITE) message to an originating P-CSCF 1504 which communicates with a corresponding originating S-CSCF 1506. The originating S-CSCF 1506 can submit the SIP INVITE message to one or more application servers (ASs) 1517 that can provide a variety of services to IMS subscribers.

For example, the application servers 1517 can be used to perform originating call feature treatment functions on the calling party number received by the originating S-CSCF 1506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1506 can submit queries to the ENUM system 1530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1507 to submit a query to the HSS 1540 to identify a terminating S-CSCF 1514 associated with a terminating IMS CD such as reference 1502. Once identified, the I-CSCF 1507 can submit the SIP INVITE message to the terminating S-CSCF 1514. The terminating S-CSCF 1514 can then identify a terminating P-CSCF 1516 associated with the terminating CD 1502. The P-CSCF 1516 may then signal the CD 1502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 15 may be interchangeable. It is further noted that communication system 1500 can be adapted to support video conferencing. In addition, communication system 1500 can be adapted to provide the IMS CDs 1501, 1502 with the multimedia and Internet services of communication system 1400 of FIG. 14.

If the terminating communication device is instead a PSTN CD such as CD 1503 or CD 1505 (in instances where the cellular phone only supports circuit-switched voice communications), the ENUM system 1530 can respond with an unsuccessful address resolution which can cause the originating S-CSCF 1506 to forward the call to the MGCF 1520 via a Breakout Gateway Control Function (BGCF) 1519. The MGCF 1520 can then initiate the call to the terminating PSTN CD over the PSTN network 1560 to enable the calling and called parties to engage in voice and/or data communications.

It is further appreciated that the CDs of FIG. 15 can operate as wireline or wireless devices. For example, the CDs of FIG. 15 can be communicatively coupled to a cellular base station 1521, a femtocell, a WiFi router, a Digital Enhanced Cordless Telecommunications (DECT) base unit, or another suitable wireless access unit to establish communications with the IMS network 1550 of FIG. 15. The cellular access base station 1521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 15.

Cellular phones supporting LTE can support packet-switched voice and packet-switched data communications and thus may operate as IMS-compliant mobile devices. In this embodiment, the cellular base station 1521 may communicate directly with the IMS network 1550 as shown by the arrow connecting the cellular base station 1521 and the P-CSCF 1516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 1430 of FIG. 14 can be operably coupled to communication system 1500 for purposes similar to those described above. Server 1430 can perform function 1462 and thereby provide media source services to the CDs 1501, 1502, 1503 and 1505 of FIG. 15 similar to the functions described for server 130 of FIG. 1 in accordance with method 1300 of FIG. 13. CDs 1501, 1502, 1503 and 1505, which can be adapted with software to perform function 1572 to utilize the services of the server 1430 similar to the functions described for communication devices 130 of FIG. 1 in accordance with method 1300 of FIG. 13. Server 1430 can be an integral part of the application server(s) 1517 performing function 1574, which can be substantially similar to function 1462 and adapted to the operations of the IMS network 1550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 16:
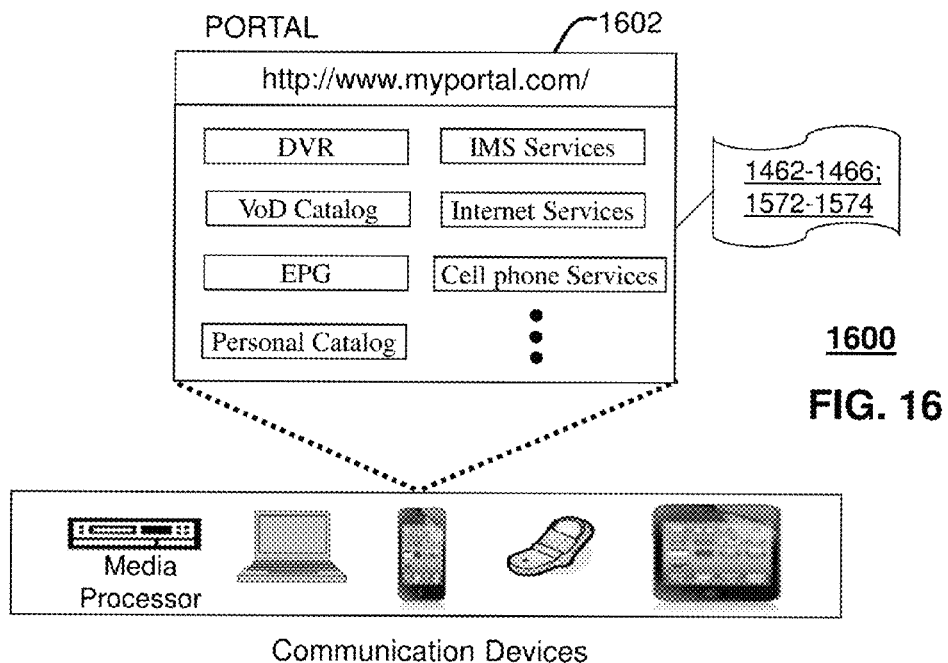
FIG. 16 depicts an illustrative embodiment of a web portal for interacting with the communication systems that provide media services of for the display modules and modular display devices of FIGS. 1 through 12B.

FIG. 16 depicts an illustrative embodiment of a web portal 1602 of a communication system 1600. Communication system 1600 can be overlaid or operably coupled with systems 100-1200 of FIGS. 1 through 12B, communication system 1400, and/or communication system 1500 as another representative embodiment of systems 100-1200 of FIGS. 1 through 12B, communication system 1400, and/or communication system 1500. The web portal 1602 can be used for managing services of systems 100-1200 of FIGS. 1 through 12B and communication systems 1400-1500. A web page of the web portal 1602 can be accessed by a Uniform Resource Locator (URL) with an Internet browser using an Internet-capable communication device such as those described in FIGS. 1 through 12B and FIGS. 14-15. The web portal 1602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 1602 can also be used for provisioning IMS services described earlier, provisioning Internet services, provisioning cellular phone services, and so on.

The web portal 1602 can further be utilized to manage and provision software applications 1462-1466, and 1572-1574 to adapt these applications as may be desired by subscribers and/or service providers of systems 100-1200 of FIGS. 1 through 12B, and communication systems 1400-1500. For instance, users of the services provided by server 130 or server 1430 can log into their on-line accounts and provision the servers 130 or server 1430 with to program user profiles or to provide contact information to server to enable it to communication with devices described in FIGS. 1-15. Service providers can log onto an administrator account to provision, monitor and/or maintain the systems 100-1200 of FIGS. 1 through 12B or server 430.

Figure 17:
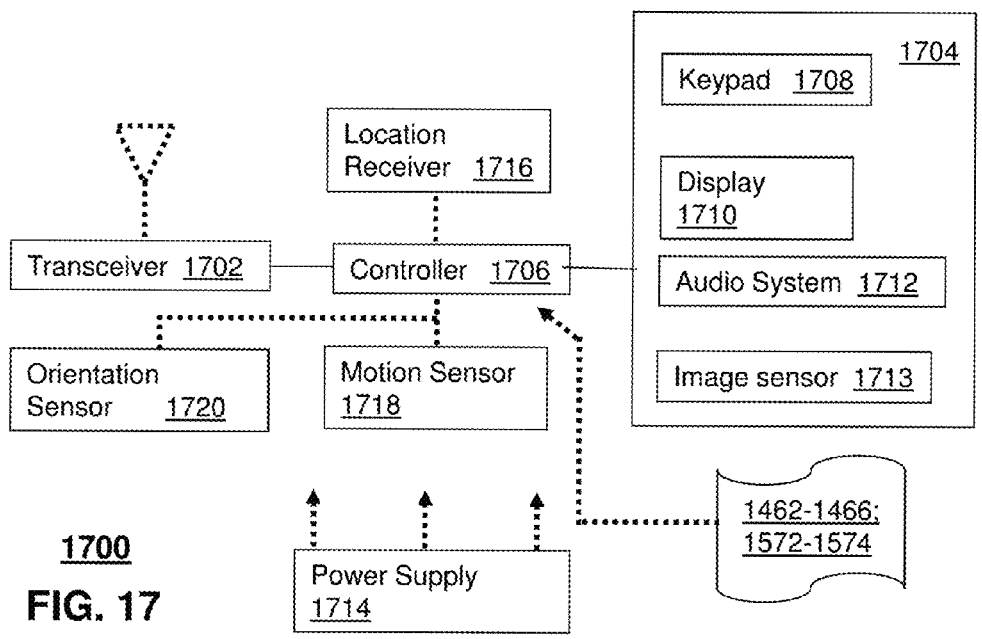
FIG. 17 depicts an illustrative embodiment of a communication device.

FIG. 17 depicts an illustrative embodiment of a communication device 1700. Communication device 1700 can serve in whole or in part as an illustrative embodiment of the devices depicted in FIGS. 1 through 12B, and FIGS. 14-15. Communication device 1700 in whole or in part can represent any of the communication devices described in FIGS. 1 through 12B and 14-15 can be configured to perform portions of method 1300 of FIG. 13.

Communication device 1700 can comprise a wireline and/or wireless transceiver 1702 (herein transceiver 1702), a user interface (UI) 1704, a power supply 1714, a location receiver 1716, a motion sensor 1718, an orientation sensor 1720, and a controller 1706 for managing operations thereof. The transceiver 1702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1702 can also be adapted to support circuit-switched wireline access technologies (such as PSTN), packet-switched wireline access technologies (such as TCP/IP, VoIP, etc.), and combinations thereof.

The UI 1704 can include a depressible or touch-sensitive keypad 1708 with a navigation mechanism such as a roller ball, a joystick, a mouse, or a navigation disk for manipulating operations of the communication device 1700. The keypad 1708 can be an integral part of a housing assembly of the communication device 1700 or an independent device operably coupled thereto by a tethered wireline interface (such as a USB cable) or a wireless interface supporting for example Bluetooth®. The keypad 1708 can represent a numeric keypad commonly used by phones, and/or a QWERTY keypad with alphanumeric keys. The UI 1704 can further include a display 1710 such as monochrome or color LCD (Liquid Crystal Display), OLED (Organic Light Emitting Diode) or other suitable display technology for conveying images to an end user of the communication device 1700. In an embodiment where the display 1710 is touch-sensitive, a portion or all of the keypad 1708 can be presented by way of the display 1710 with navigation features.

The display 1710 can use touch screen technology to also serve as a user interface for detecting user input. As a touch screen display, the communication device 1700 can be adapted to present a user interface with graphical user interface (GUI) elements that can be selected by a user with a touch of a finger. The touch screen display 1710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1710 can be an integral part of the housing assembly of the communication device 1700 or an independent device communicatively coupled thereto by a tethered wireline interface (such as a cable) or a wireless interface.

The UI 1704 can also include an audio system 1712 that utilizes audio technology for conveying low volume audio (such as audio heard in proximity of a human ear) and high volume audio (such as speakerphone for hands free operation). The audio system 1712 can further include a microphone for receiving audible signals of an end user. The audio system 1712 can also be used for voice recognition applications. The UI 1704 can further include an image sensor 1713 such as a charged coupled device (CCD) camera for capturing still or moving images.

The power supply 1714 can utilize common power management technologies such as replaceable and rechargeable batteries, supply regulation technologies, and/or charging system technologies for supplying energy to the components of the communication device 1700 to facilitate long-range or short-range portable applications. Alternatively, or in combination, the charging system can utilize external power sources such as DC power supplied over a physical interface such as a USB port or other suitable tethering technologies.

The location receiver 1716 can utilize location technology such as a global positioning system (GPS) receiver capable of assisted GPS for identifying a location of the communication device 1700 based on signals generated by a constellation of GPS satellites, which can be used for facilitating location services such as navigation. The motion sensor 1718 can utilize motion sensing technology such as an accelerometer, a gyroscope, or other suitable motion sensing technology to detect motion of the communication device 1700 in three-dimensional space. The orientation sensor 1720 can utilize orientation sensing technology such as a magnetometer to detect the orientation of the communication device 1700 (north, south, west, and east, as well as combined orientations in degrees, minutes, or other suitable orientation metrics).

The communication device 1700 can use the transceiver 1702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1700.

Other components not shown in FIG. 17 can be used in one or more embodiments of the subject disclosure. For instance, the communication device 1700 can include a reset button (not shown). The reset button can be used to reset the controller 1706 of the communication device 1700. In yet another embodiment, the communication device 1700 can also include a factory default setting button positioned, for example, below a small hole in a housing assembly of the communication device 1700 to force the communication device 1700 to re-establish factory settings. In this embodiment, a user can use a protruding object such as a pen or paper clip tip to reach into the hole and depress the default setting button. The communication device 1700 can also include a slot for adding or removing an identity module such as a Subscriber Identity Module (SIM) card. SIM cards can be used for identifying subscriber services, executing programs, storing subscriber data, and so forth.

The communication device 1700 as described herein can operate with more or less of the circuit components shown in FIG. 17. These variant embodiments can be used in one or more embodiments of the subject disclosure.

The communication device 1700 can be adapted to perform the functions of devices of 1 through 12B, the media processor 406, the media devices 408, or the portable communication devices 1416 of FIG. 14, as well as the IMS CDs 1501-1502 and PSTN CDs 1503-1505 of FIG. 15. It will be appreciated that the communication device 1700 can also represent other devices that can operate in systems of FIGS. 1 through 12B, communication systems 400-1500 of FIGS. 4-15 such as a gaming console and a media player.

The communication device 1700 shown in FIG. 17 or portions thereof can serve as a representation of one or more of the devices of system of FIGS. 1 through 12B, communication system 1400, and communication system 1500. In addition, the controller 1706 can be adapted in various embodiments to perform the functions 1462-1466 and 1572-1574, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 18:
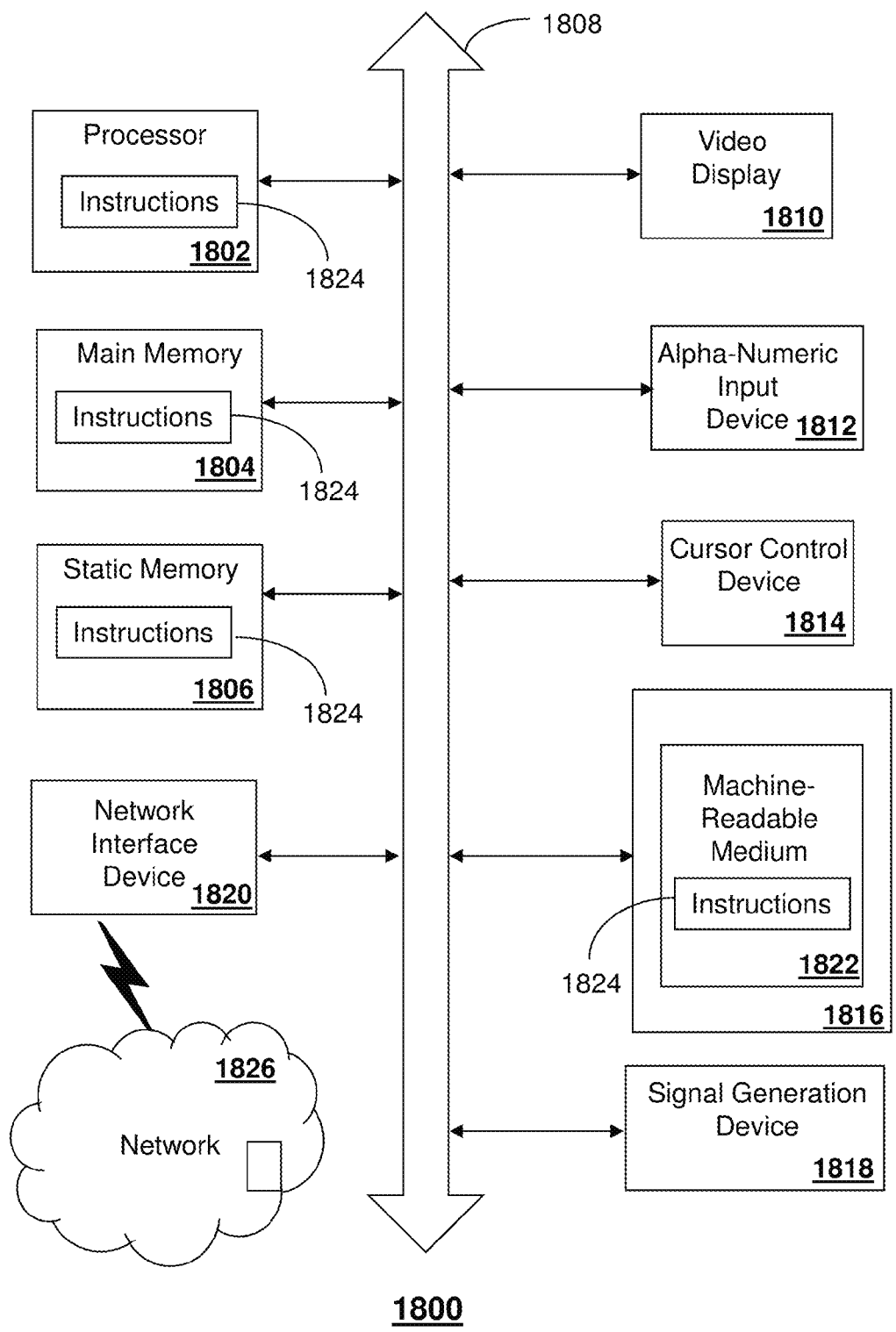
FIG. 18 is a diagrammatic representation of a machine in the form of a computer system within which a set of instructions, when executed, may cause the machine to perform any one or more of the methods described herein.

FIG. 18 depicts an exemplary diagrammatic representation of a machine in the form of a computer system 1800 within which a set of instructions, when executed, may cause the machine to perform any one or more of the methods described above. One or more instances of the machine can operate, for example, as the server 130, the media processor 106, the modular display device 108, and other devices of FIGS. 1-12B. In some embodiments, the machine may be connected (e.g., using a network 1826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1800 may include a processor (or controller) 1802 (e.g., a central processing unit (CPU)), a graphics processing unit (GPU, or both), a main memory 1804 and a static memory 1806, which communicate with each other via a bus 1808. The computer system 1800 may further include a display unit 1810 (e.g., a liquid crystal display (LCD), a flat panel, or a solid state display). The computer system 1800 may include an input device 1812 (e.g., a keyboard), a cursor control device 1814 (e.g., a mouse), a disk drive unit 1816, a signal generation device 1818 (e.g., a speaker or remote control) and a network interface device 1820. In distributed environments, the embodiments described in the subject disclosure can be adapted to utilize multiple display units 1810 controlled by two or more computer systems 1800. In this configuration, presentations described by the subject disclosure may in part be shown in a first of the display units 1810, while the remaining portion is presented in a second of the display units 1810.

The disk drive unit 1816 may include a tangible computer-readable storage medium 1822 on which is stored one or more sets of instructions (e.g., software 1824) embodying any one or more of the methods or functions described herein, including those methods illustrated above. The instructions 1824 may also reside, completely or at least partially, within the main memory 1804, the static memory 1806, and/or within the processor 1802 during execution thereof by the computer system 1800. The main memory 1804 and the processor 1802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
 a video streaming module; and
 a composite display comprising a plurality of display modules in a module array, wherein the plurality of display modules are selectively detachable from the composite display, and wherein a display module of the plurality of display modules comprises:
  a video display disposed on a front side of the display module;
  a memory to store executable instructions and video display data; and
  a processing system comprising a processor communicatively coupled to the video display and the memory, wherein the processing system, responsive to executing the executable instructions, performs operations comprising:
   receiving configuration information from the video streaming module, wherein the configuration information defines a module location for the display module in the module array;
   receiving a multicast video stream from the video streaming module;
   updating the video display data at the memory based on the multicast video stream that is received and according to the module location of the display module, wherein the plurality of display modules provide a seamless visual surface to present the multicast video stream;
   comparing a first pixel density of the video display of the display module to another pixel density of another video display of another display module of the plurality of display modules to determine a difference between the first pixel density and the other pixel density, wherein the display module and the other display module are adjacent in the module array;
   modifying, at the display module, the first pixel density of the video display of the display module to generate a modified display resolution according to the difference between the first pixel density to the other pixel density to smooth an appearance of the difference between the first pixel density and the other pixel density in the composite display; and presenting the video display data at the video display of the display module according to the modified display resolution and responsive to updating of the video display data; and receiving a master clock signal from the video streaming module, wherein the updating of the video display data is synchronized to the master clock signal.

2. The device of claim 1, wherein the first pixel density of the video display is modified by the display module so that an image created by the video display of the display module mimics another image created at the other video display.

3. The device of claim 1, wherein the modifying comprises applying a softening algorithm to edges of the video display of the display module to reduce visual differences between the display module and the other display module.

4. The device of claim 1, wherein a portion of the plurality of display modules present a programming guide.

5. The device of claim 1, wherein a portion of the plurality of display modules present a picture-in-picture function.

6. The device of claim 1, wherein the display module comprises a different display size than the other display module.

7. The device of claim 1, wherein a display module of the plurality of display modules comprises a non-cuboid, three-dimensional shape.

8. The device of claim 1, wherein the video streaming module comprises one of a high-definition multimedia interface, a digital visual interface, a smart television application, a media processor interface, or a combination thereof.

9. The device of claim 1, wherein the streaming module and the display module are of same physical size and shape.

10. The device of claim 1, further comprising a power supply module, wherein each display module further comprises a power bus comprising power supply connectors disposed on perimeter sides of the display module, and wherein the display module further performs operations comprising receiving, at the power bus, signals from the power supply module for powering the display module.

11. The device of claim 1, further comprising an input/output module and wherein the display module further performs operations comprising transmitting, at an input/output bus, signals to the input/output module for controlling the input/output module.

12. The device of claim 1, further comprising an input/output module and wherein the display module further performs operations comprising receiving, at an input/output bus, signals from the input/output module for controlling the display module.

13. The device of claim 1, wherein the plurality of display modules are joined edge to edge on the composite display to present the multicast video stream with no visible gaps between each adjacent display module.

14. A device, comprising:
a video display disposed on a front side;
a memory to store executable instructions and video display data; and
a processing system comprising a processor communicatively coupled to the video display, and the memory, wherein the processing system, responsive to executing the executable instructions, performs operations comprising:
receiving configuration information from a video streaming module of a modular display device, wherein the configuration information defines a module location in a module array of the modular display device, wherein the modules of the modular display device are selectively detachable and provide a seamless visual surface between the modules;
receiving a multicast video stream from the video streaming module;
updating the video display data at the memory from the multicast video stream according to the module location, wherein the updating is synchronized to a master clock for the modular display device;
comparing a first pixel density of a first video display of a first display module to a second pixel density of a second video display of a second display module of a plurality of display modules in a module array to determine a difference between the first pixel density and the second pixel density, wherein the first display module and the second display module are adjacent in the module array;
modifying the first pixel density of the first video display of the first display module to generate a modified display resolution according to the difference between the first pixel density to the second pixel density to smooth an appearance of the difference between the first pixel density and the second pixel density in the modular display device; and
presenting the video display data at the video display according to the modified display resolution and responsive to the updating of the video display data.

15. The device of claim 14, comprising a data bus comprising bus connectors disposed on perimeter sides, wherein the operations further comprise forwarding the multicast video stream to a second device via a data bus.

16. The device of claim 15, wherein the perimeter sides are angled away from the video display.

17. The device of claim 14, further comprising a camera device, wherein the operations further comprise:
capturing a video image data at the camera device; and
transmitting the video image data to a storage device of the modular display device.

18. A method, comprising:
receiving, by a processing system comprising a processor, a multicast video stream directed to a composite array of a plurality of display modules of a modular display, wherein the plurality of display modules are selectively detachable from the modular display;
extracting, by the processing system, video display data from the multicast video stream according to a location within the composite array of a first display module of the plurality of display modules, wherein the video display data includes configuration information to define a module location for the display module in the composite array, and wherein the plurality of display modules provide a seamless visual surface to present the multicast video stream; and
updating, by the system, a video display of the first display module according to the video display data that is extracted from the multicast video stream, wherein the updating is synchronized to a master clock of the modular display, wherein the first display module is adjacent to a second display module in the modular display, wherein the first display module compares a first pixel density of the video display of the display module to a second pixel density of a second video display of a second display module of the plurality of display modules to determine a difference between the first pixel density and the second pixel density, wherein the first display module modifies the first pixel density of the video display of the display module to generate a modified display resolution according to the difference between the first pixel density to the second pixel density to smooth an appearance of the difference between the first pixel density and the second pixel density in the modular display, and wherein the first display module presents the video display data at the video display of the display module according to the modified display resolution and responsive to updating of the video display data.

19. The method of claim 18, further comprising forwarding, by the processing system, the multicast video stream to the second display module via a data bus that is disposed on perimeter sides of the first display module.

20. The device of claim 1, further comprising a plurality of function modules, wherein the function modules are detachable with the composite display, wherein the plurality of function modules comprise:
- a processing system including a processor; and
- a memory that stores executable instructions that, when executed by the processing system, facilitate performance of operations, comprising one of:
  - providing a power module function to the composite display;
  - a digital rights management module function to receive and decode content for the video streaming module;
  - a speaker module to receive and output audio data from the composite display;
  - a network element to provide network capability to the composite display; and
  - a remote control element to receive an input from a remote control device and to provide the input to the composite display.

\* \* \* \* \*